(12) United States Patent
Gopalan et al.

(10) Patent No.: US 10,092,913 B2
(45) Date of Patent: Oct. 9, 2018

(54) FLUIDIC NOZZLE AND IMPROVED MOVING VORTEX GENERATING FLUIDIC OSCILLATOR

(71) Applicant: DLHBOWLES, INC., Canton, OH (US)

(72) Inventors: Shridhar Gopalan, Westminster, MD (US); Evan Hartranft, Bowie, MD (US)

(73) Assignee: DLHBOWLES, INC., Canton, OH (US)

(*) Notice: Subject to any disclaimer, the term of this patent is extended or adjusted under 35 U.S.C. 154(b) by 0 days.

(21) Appl. No.: 14/738,024

(22) Filed: Jun. 12, 2015

(65) Prior Publication Data

US 2016/0030954 A1    Feb. 4, 2016

Related U.S. Application Data

(63) Continuation-in-part of application No. PCT/US2013/074603, filed on Dec. 12, 2013.

(60) Provisional application No. 62/120,969, filed on Feb. 26, 2015, provisional application No. 61/736,306, filed on Dec. 12, 2012.

(51) Int. Cl.
*B05B 1/00* (2006.01)
*B05B 1/08* (2006.01)
*B60S 1/52* (2006.01)

(52) U.S. Cl.
CPC . *B05B 1/08* (2013.01); *B60S 1/52* (2013.01)

(58) Field of Classification Search
CPC .................................. B05B 1/08; B05B 3/02
USPC ........... 239/589.1, 101, 553, 462, 590, 600, 239/590.5, DIG. 3; 137/826, 833, 835
See application file for complete search history.

(56) References Cited

U.S. PATENT DOCUMENTS

| 4,231,519 A * | 11/1980 | Bauer ...................... B05B 1/08 137/826 |
| 4,463,904 A | 8/1984 | Bray |
| 6,253,782 B1 | 7/2001 | Raghu |
| 6,581,856 B1 * | 6/2003 | Srinath ..................... B05B 1/08 239/428 |

(Continued)

FOREIGN PATENT DOCUMENTS

| FR | 2915251 | 10/2008 |
| JP | 2002067887 | 3/2002 |
| WO | 2005021341 | 3/2005 |

*Primary Examiner* — Steven J Ganey
*Assistant Examiner* — Viet Le
(74) *Attorney, Agent, or Firm* — McDonald Hopkins LLC

(57) ABSTRACT

A fluidic circuit configured to spray an oscillating pattern of fluid droplets, having an inlet in fluid communication with a source and including a power nozzle with an oscillation chamber having a fluid jet steering section in fluid communication with the power nozzle and having either (a) a first fluid pressure accumulating volume opposite a second fluid pressure accumulating volume or (b) a first fluid jet attachment feature opposing a second fluid jet attachment feature. The fluid jet steering section is in fluid communication with and emits a fluid jet into an oscillation inducing interaction region with opposing first and second side wall ears or features which define an oscillation inducing interaction region in the oscillation chamber for causing the jet of fluid to rhythmically sweep back and forth between the sidewalls in the oscillation chamber and create a distally projecting oscillating spray.

29 Claims, 24 Drawing Sheets

(56) References Cited

U.S. PATENT DOCUMENTS

| | | |
|---|---|---|
| 7,014,131 B2 | 3/2006 | Berning et al. |
| 7,267,290 B2 | 9/2007 | Gopalan et al. |
| 7,651,036 B2 | 1/2010 | Gopalan |
| 2008/0011868 A1* | 1/2008 | Gopalan .................. B05B 1/08 239/11 |
| 2010/0276521 A1 | 11/2010 | Gopalan |
| 2015/0166020 A1* | 6/2015 | Kong ....................... B60S 1/52 239/284.1 |

* cited by examiner

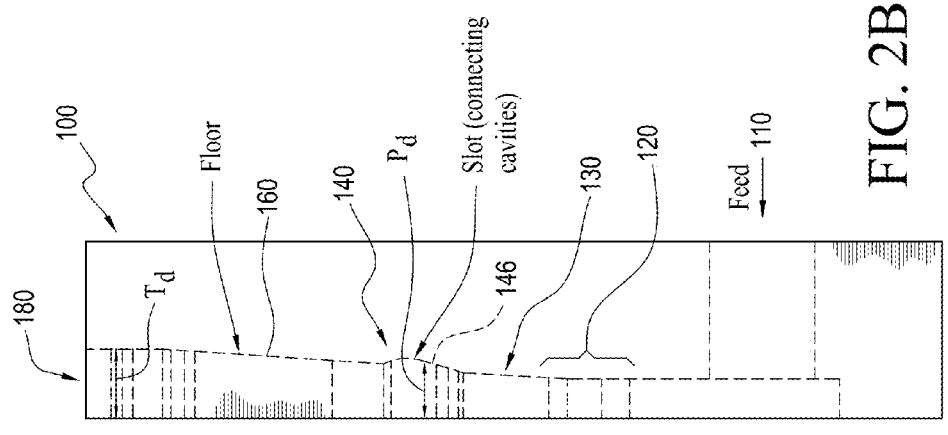
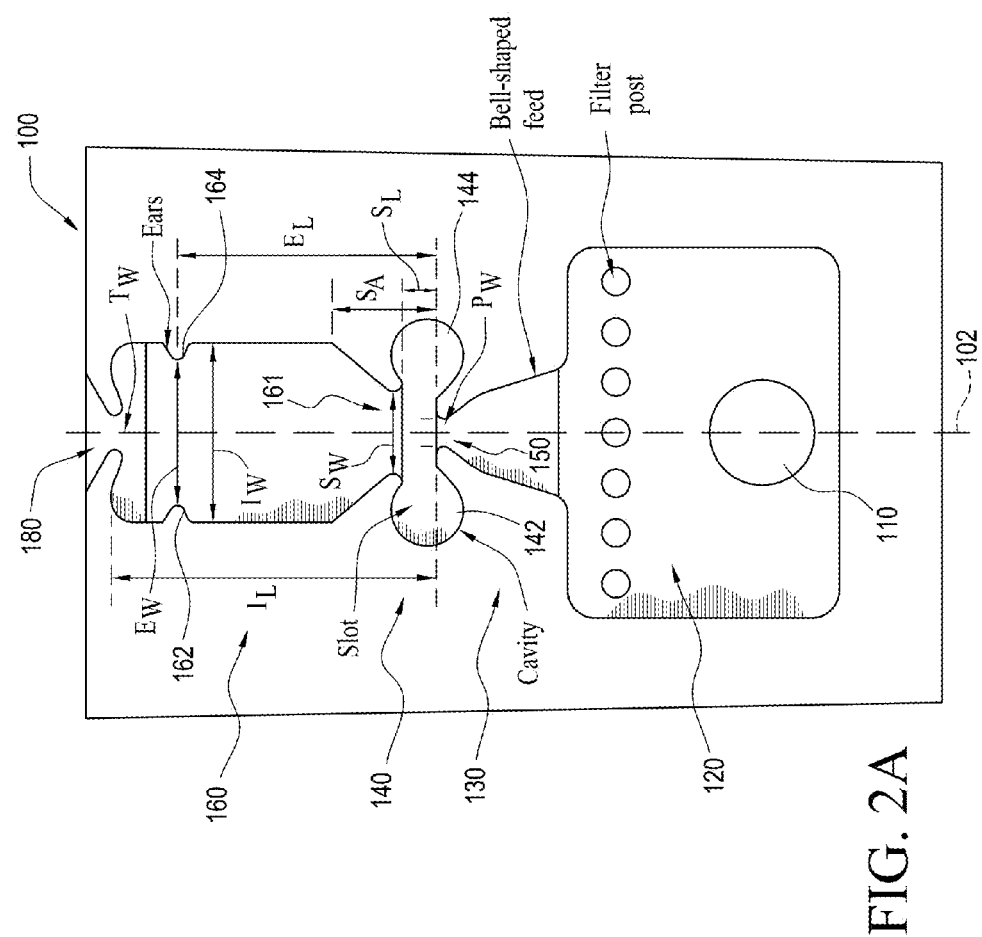
FIG. 2B
FIG. 2A

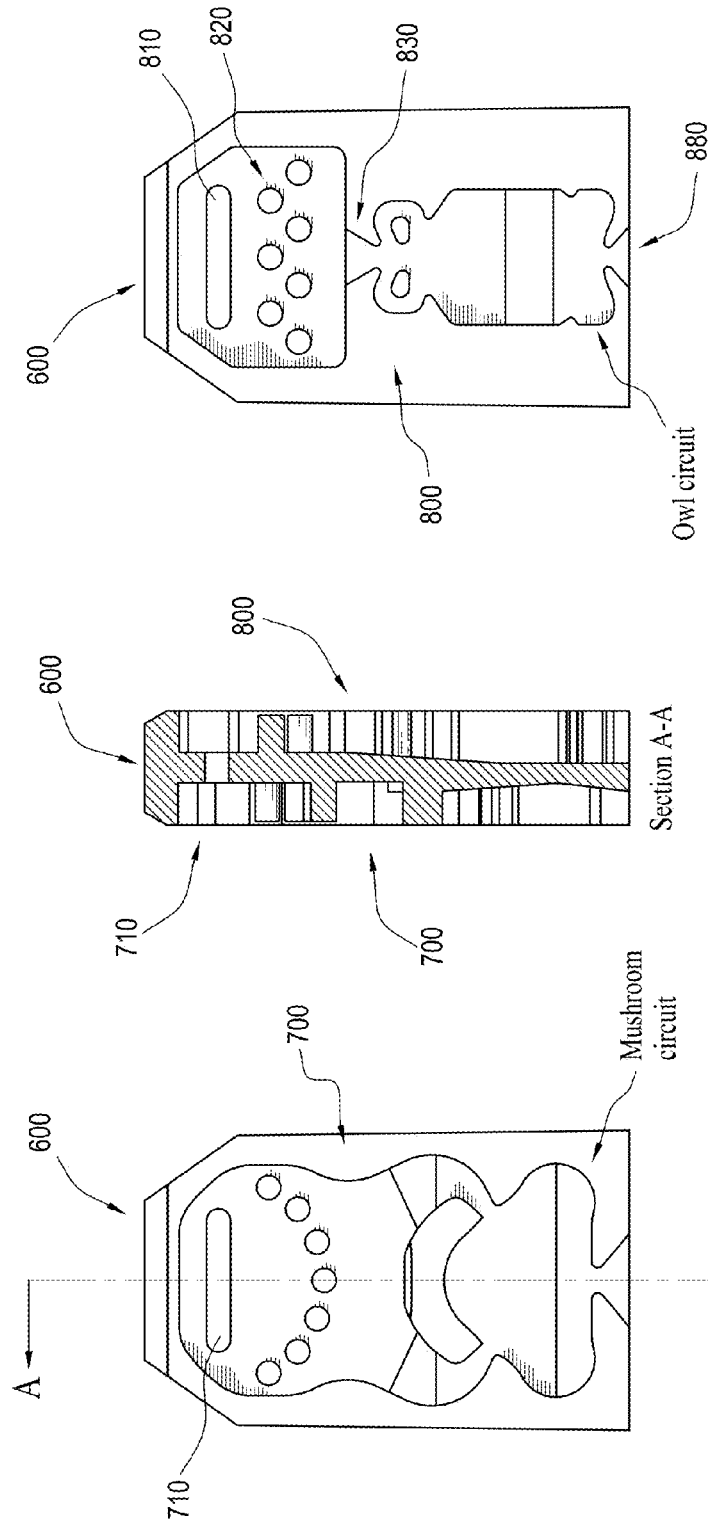

Owl oscillator with splitter

FLUIDIC NOZZLE AND IMPROVED MOVING VORTEX GENERATING FLUIDIC OSCILLATOR

REFERENCES TO RELATED APPLICATIONS

This application is claims priority to commonly owned (a) U.S. provisional patent application No. 62/120,969 entitled Double-bowl and bump-slot fluidic oscillator circuits and fluidic nozzle assemblies and method for generating sprays with enhanced cold performance, filed on Feb. 26, 2015, (b) U.S. provisional patent application No. 61/736,306, filed Dec. 12, 2012, and (c) PCT Application no. PCT/US13/74603, filed Dec. 12, 2013, both entitled Fluidic Nozzle and Oscillator Circuit, the entire disclosures of which are incorporated herein by reference. This application is also related to commonly owned U.S. patent application Ser. Nos. 12/314,242 and 12/467,270 as well as commonly owned with related U.S. Pat. Nos. 4,463,904, 7,014,131, 7,267,290 and 7,651,036, the entire disclosures of which are also incorporated herein by reference.

BACKGROUND OF THE INVENTION

Field of the Invention

The present invention relates to fluidic circuits and nozzle assemblies configured with fluidic circuit oscillators, and more particularly to fluidic nozzle and circuit assemblies configured to generate a spray for automotive, industrial and consumer applications.

Discussion of the Prior Art

A fluidic nozzle creates a stream of fluid that oscillates within an included angle, known as the fan angle, as illustrated in FIGS. 1A-1C. The distribution of the fluid within this fan will vary depending on the type of fluidic circuit used. For example, in the mushroom circuit disclosed in applicant's U.S. Pat. No. 7,267,290, the oscillating stream will tend to dwell briefly at the extremes of its travel, creating a fluid distribution or spray pattern that is called a heavy-ended fan as illustrated in FIG. 1E. Some circuits may include a splitter, which can increase the maximum fan angle and spray velocity. In this case, the oscillating stream will tend to dwell on the splitter, causing a fluid distribution or spray pattern that is called a center-heavy fan.

The fluid distribution can be important in several applications for fluidic nozzles. In an irrigation nozzle, for example, it is desirable to distribute water evenly over a given area or shape (for example, a quarter circle.) If a heavy-ended fluidic were to be used in such a case, more fluid would be deposited on the edges of the spray, and less in the center. Furthermore, since the trajectory of the droplets is related to droplet size and velocity, the irrigation nozzle will tend to throw water further on the ends than in the middle. Many irrigation nozzle assemblies have spray patterns with several heavy bands.

Another common application for fluidic nozzles is to distribute windshield cleaning fluid across a windshield. In this case, parts of the windshield may be covered with large amounts of wiper fluid, while other parts get only a light coating. In many cleaning applications, it is desirable to distribute fluid as evenly as possible over specific areas.

For contemporary automotive applications (e.g., as discussed generally in applicant's commonly owned U.S. Pat. Nos. 7,014,131, 7,267,290 and 7,651,036) windshield washer nozzles are needed with improved dynamic performance, which means automotive windshield washing system designers want sprays having large droplets delivered at higher velocities to withstand high speeds when the car is in motion. This characteristic is referred to as dynamic performance. Additionally, the spray nozzle needs to work with cold liquid mixtures (e.g., typical windshield washer fluids comprising methanol/ethanol water mixes). This characteristic is referred to as cold performance.

For an illustrative example of how a fluidic oscillator or fluidic circuit might be employed, as shown in applicant's U.S. Pat. No. 7,651,036 and illustrated in FIGS. 1A-1F, a nozzle assembly 10 is configured with a housing which defines a substantially hollow fluid-impermeable structure with an interior lumen and one or more ports or slots 20, each defining a substantially rectangular passage or aperture with smooth interior slot wall surfaces 22. The interior sidewall surfaces 22 are preferably dimensioned for cost effective fabrication using molding methods and preferably include sidewall grooves positioned and dimensioned to form a "snap fit" with ridges or tabs in a mating fluidic circuit insert (e.g., 18). Nozzle assembly 10 can be configured to include one or more fluidic circuit inserts or chips which are dimensioned to be tightly received in and held by the slot 20 defined within the sidewall of the housing. When fluidic circuit insert 18 is fitted tightly within port or slot 20, the nozzle assembly provides a channel for fluid communication between the housing's interior lumen and the exterior of the housing so that fluid entering the housing's interior lumen may be used to generate an oscillating spray directed distally and aimed by the orientation and configuration of the housing, but better cold performance and spray velocity are needed. Prior art windshield washer systems do not provide adequate dynamic performance (or spray velocity) and cold performance for some applications.

There is a need, therefore, for a durable, reliable and cost effective nozzle structure and fluid distribution or spray generation method to broaden the dynamic and cold performance envelope for nozzle assemblies to be used in automotive, industrial and consumer applications.

OBJECTS AND SUMMARY OF THE INVENTION

Accordingly, it is an object of the present invention to overcome the above mentioned difficulties by providing a durable, reliable and cost effective nozzle structure and fluid distribution or spray generation method to broaden the dynamic and cold performance envelope for nozzle assemblies to be used in automotive, industrial and consumer applications.

Another object of the present invention is to provide a fluidic nozzle and oscillator circuit having improved dynamic and cold performance.

In accordance with the structure and method of the present invention, a fluidic circuit is configured as a nozzle assembly with a fluidic oscillator. Fluidic oscillators or fluidic circuits are often configured for use in housings which define a channel, port or slot that receives and provides boundaries for the fluid paths defined in the fluidic circuit. For an illustrative example of how a fluidic oscillator or fluidic circuit might be employed, as shown in applicant's U.S. Pat. No. 7,651,036, FIG. 4, a nozzle assembly is configured with a housing which defines a substantially hollow fluid-impermeable structure with an interior lumen and one or more ports or slots defining a substantially rectangular passage or aperture with smooth interior slot wall surfaces.

A nozzle assembly can be configured to include one or more fluidic circuit inserts or chips which are dimensioned to be tightly received in and held by the slot defined within the sidewall of the housing. When the fluidic circuit insert is fitted tightly within the housing's port or slot, the nozzle assembly provides a channel for fluid communication between the housing's interior lumen and the exterior of the housing so that fluid entering the housing's interior lumen may be used to generate an oscillating spray directed distally and aimed by the orientation and configuration of the housing.

The fluidic circuit of the present invention operates on a cyclic jet wall attachment-detachment mechanism resulting in reliable formation of moving vortices which generate a repeatable oscillating jet stream and subsequent spray. Current prototypes of the circuit of the present invention produce a planar spray with a fan angles from 15° to 135°. A $1^{st}$ embodiment of the fluidic circuit of the present invention has a plurality of sections which cooperate with one another to act upon the flowing fluid passing therethrough to generate internal vortices and a desired oscillating spray. In sequence, fluid initially flows into an inlet which passes through an optional filtering section and then into a power nozzle section, where fluid then passes into a fluid jet-steering vortex generating cavity section. The cavity section's outlet is the inlet for an interaction region which terminates in a throat configured to emit the oscillating spray into the ambient environment.

Prototype embodiments of the fluidic circuit of the present invention is described in terms of certain fluidic oscillator features and dimensions which affect and control the location and formation of circulating vortices which steer fluid flows within an interaction region within the circuit, namely:

Pw=Width of Power Nozzle,
Pd=Depth of Power Nozzle,
Tw=Width of Throat,
Td=Depth of Throat,
$I_W$=Width of Interaction Region,
$I_L$=of Interaction Region,
Ew=InterEar Gap Width between Ears, and
$E_L$=Axial Location of inwardly projecting tips of Ears, Fluid flows or enters through an inlet or feed hole into a rectangular power nozzle lumen, with dimensions Pw and Pd. There is a bell-shaped feed leading to the power nozzle which produces a fluid jet with a turbulent boundary layer that is desirable to form vortices inside an interaction region. In this first embodiment, the fluidic circuit power nozzle provides fluid to a pair of opposing symmetrical fluid vortex-steering cavities, and the size and shape of the cavities can be selected for varying sprays. Seen in plan view, circular or triangular cross section cavities have circulating flow inside them and help steer the vortex by inducing an oscillating instability to the fluid vortex or jet. An optional lateral fluid channel or slot may connect the cavities below the floor of the fluidic. Slot depth is approx. 0.1-0.2 mm below the floor of the circuit. One or more slots are not a requirement for the fluidic to work and are used to make the spray uniform, depending on the application. In many automotive applications, slots are not expected to be needed. The interaction region receives the oscillating jet and generates vortices within the interaction region.

The interaction region's length begins with a narrow channel called a Setback, having the setback width Sw, setback location $S_L$ and setback angle length $S_A$. The setback width is critical for the performance of the fluidic. The setback angle length controls the uniformity of the spray, where longer lengths produce a heavy ended spray while shorter lengths produce a uniform spray. It should be noted that $S_A$ cannot be increased indefinitely and becomes undesirably monostable for large values of $S_A$. For the Interaction region, critical width and length dimensions $I_W$ and $I_L$ are sized in relation to the Power nozzle width. These dimensions may be adjusted for packaging constraints. However, dynamic & cold performance are reduced as the interaction region size is reduced below a nominal set of proportions. The Interaction region also includes a symmetrical pair of opposing inwardly projecting features called Ears. Ears cause fluid jet detachment and are critical to the bistable operation of the fluidic.

The circuit operates on a fluid jet wall attachment/detachment cycle. With the jet at the center, large vortices are formed on either or opposing (A or B) sides and the jet attaches to either the A wall or the opposing B wall. Opposing cavities on the A and B sides have varying magnitudes of positive pressure. When cavity B momentarily has a higher pressure than opposing cavity A, the jet bends away from cavity B. Fluid from cavity A replenishes the vortex, which results in jet detaching from the wall and attaching to the other wall. Pressure builds in cavity A until it is greater than pressure in cavity B. The pressure differential causes the jet to detach from wall A and attach to wall B. The cycle then continues from cavity B resulting in an oscillating bistable jet which contributes to generation of an oscillating spray with large fast droplets, when using typical windshield washing fluid. A nozzle assembly with this fluidic exhibits the desired improved dynamic and cold performance.

More broadly, the present invention provides an improved fluidic circuit configured to spray an oscillating pattern of fluid droplets having an inlet in fluid communication with a source and including a power nozzle with an oscillation chamber having a fluid jet steering section in fluid communication with the power nozzle and having either (a) a first fluid pressure accumulating volume opposite a second fluid pressure accumulating volume or (b) a first fluid jet attachment feature opposing a second fluid jet attachment feature. The fluid jet steering section is in fluid communication with and emits a fluid jet into an oscillation inducing interaction region with opposing first and second side walls having features which define an oscillation inducing interaction region in the oscillation chamber for causing reliable formation of moving vortices which force the jet of fluid to rhythmically sweep back and forth between the sidewalls in the oscillation chamber and create a distally projecting oscillating spray.

The above and still further features and advantages of the present invention will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

FIGS. 1A-1F illustrate fluidic oscillating circuit characteristics, generally, and an example of applicant's prior art nozzle assembly as described and illustrated in commonly owned U.S. Pat. No. 7,651,036.

FIG. 2A illustrates, in elevation, a fluidic oscillator with structural features for generating an oscillating spray with large, fast droplets, when using typical windshield washing fluid and providing improved dynamic and cold performance, in accordance with the present invention.

FIG. 2B illustrates, a side view in elevation and hidden cross section, the fluidic oscillator with structural features of FIG. 2A, taken along a transverse plane aligned along the central axis defined as a line extending from the center of the feed inlet to the center of the Throat, in accordance with the present invention.

FIGS. 7A, 7B and 7C illustrate fluidic nozzle with a first fluidic oscillator (e.g., a "mushroom") circuit and second fluidic oscillator (e.g., an "owl") circuit for generating first and second oscillating sprays, where the second oscillating spray has large, fast droplets, when using typical windshield washing fluid and providing improved dynamic and cold performance, in accordance with the present invention.

Figure 8:
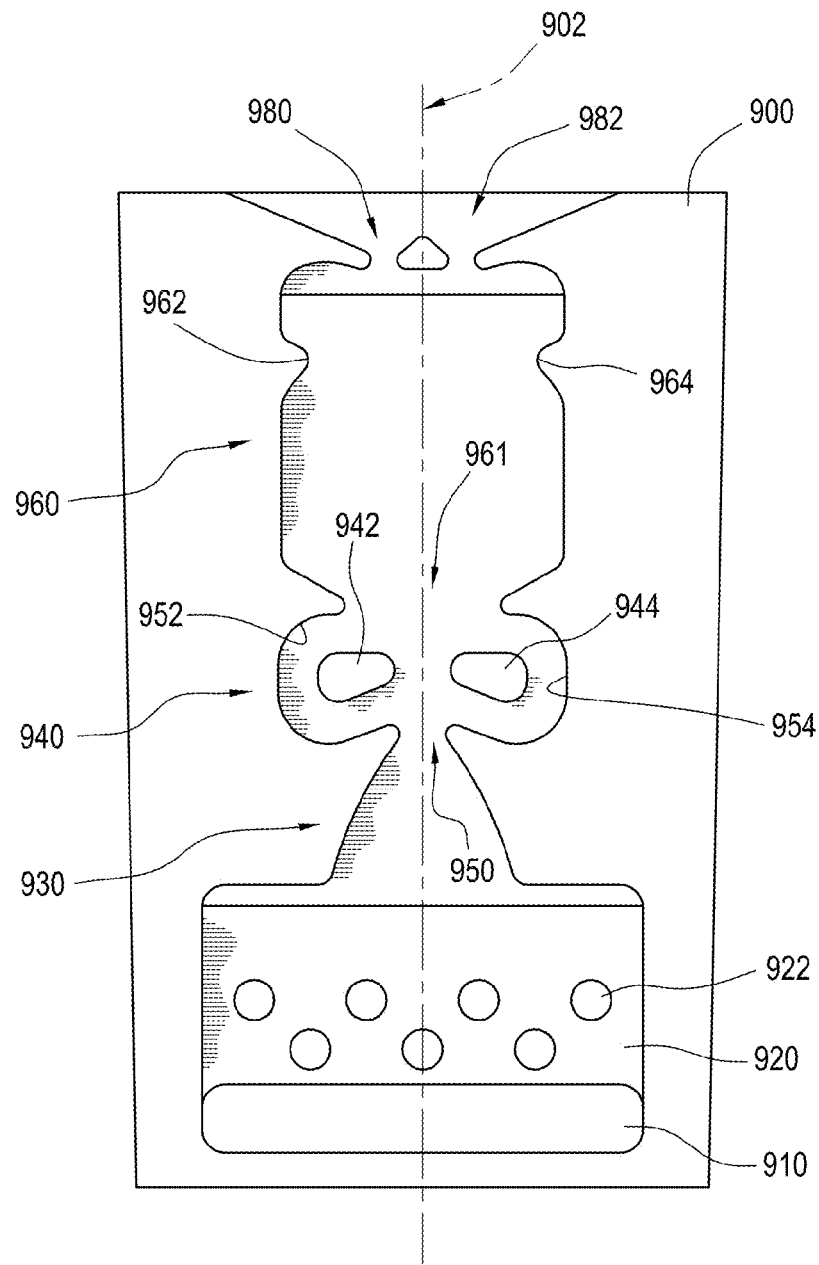

FIG. 8 illustrates, in elevation, another embodiment of a fluidic oscillator (e.g., an "owl") circuit with Island features having a selected width to promote circular flow within each cavity and help induce oscillating instability in the fluid jet and having a splitter feature at the Throat, in accordance with the present invention.

Figure 9:
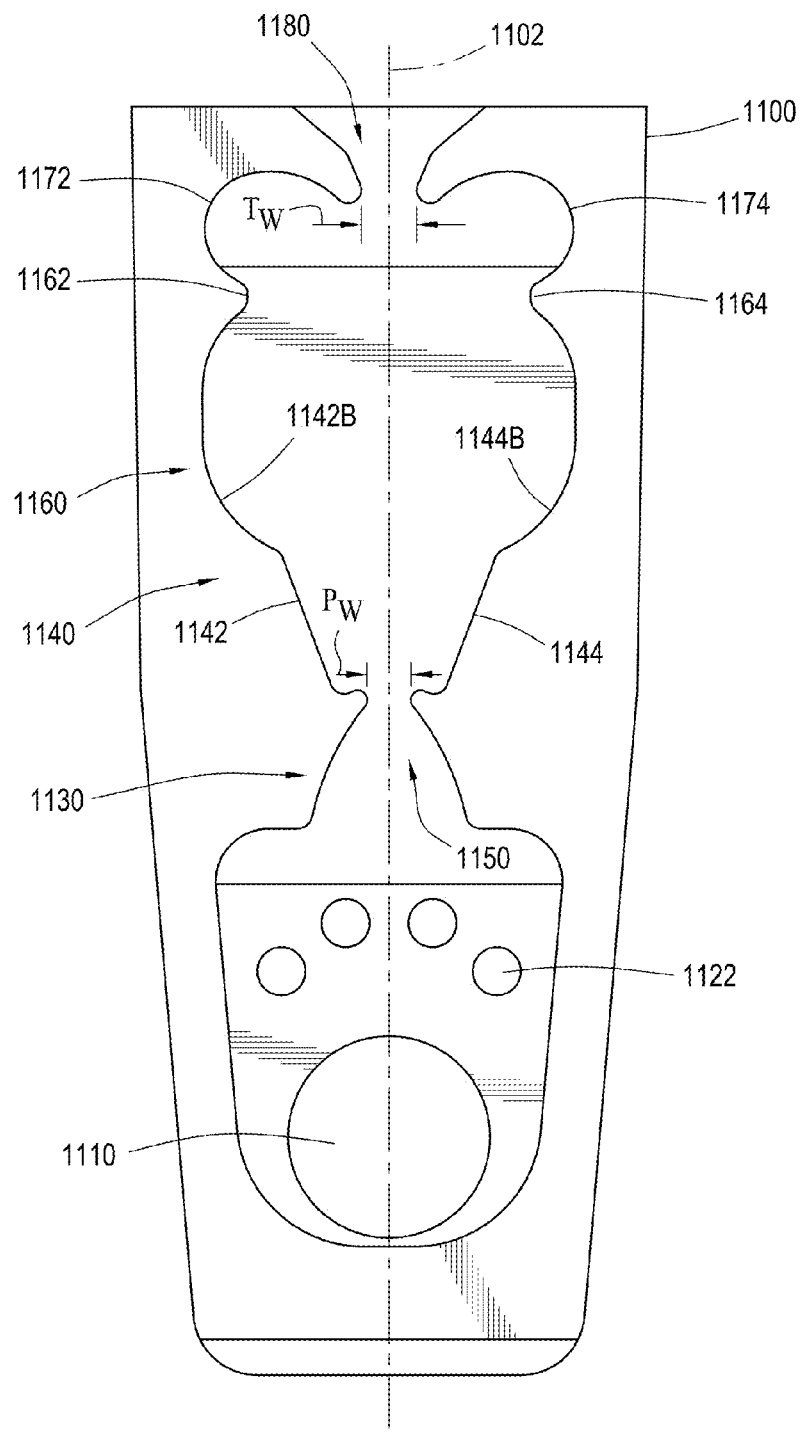

FIG. 9 illustrates, in elevation, another embodiment of a fluidic oscillator (i.e., the double bowl) configured with a novel jet steering section configured to promote rotating flow within each bowl-shape defining interaction region wall segment and help induce oscillating instability in the fluid jet in accordance with the present invention.

Figure 10A:
Figure 10B:

FIGS. 10A and 10B are photographs of a prototype of the double bowl embodiment of FIG. 9, in operation, illustrating vortices formed within and steering the spray from the double bowl oscillator, in accordance with the present invention.

Figure 11:
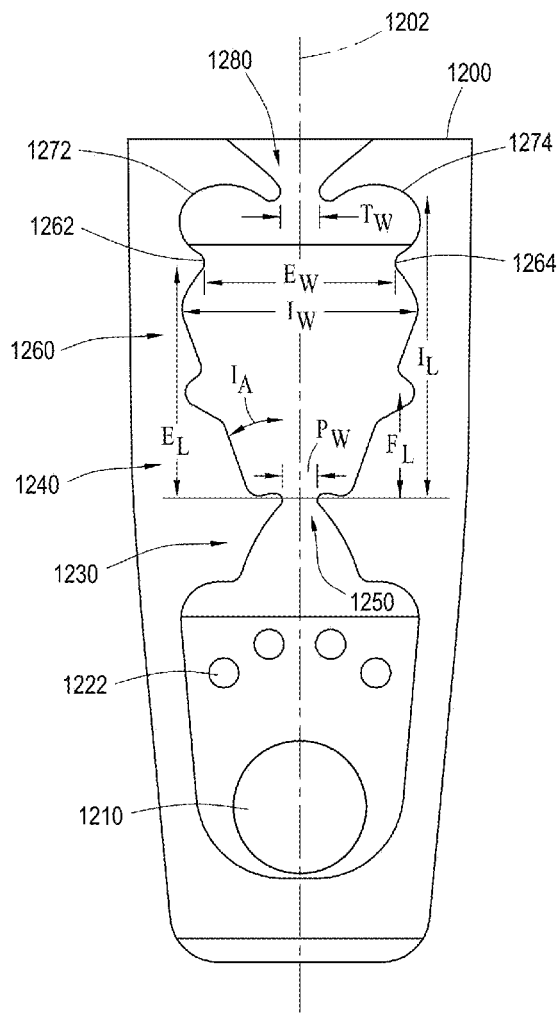

FIG. 11 illustrates, in elevation, another embodiment of a fluidic oscillator (i.e., the slot-bump) configured with another novel jet steering section to promote rotating flow within the interaction region and help induce oscillating instability in the fluid jet in accordance with the present invention.

FIGS. 12A through 12I are sequential illustrations of the slot-bump oscillator embodiment of FIG. 11 in operation, illustrating formation and movement of vortices which steer the internal fluid jet and laterally modulate the spray from the slot-bump oscillator, in accordance with the structure and method of the present invention.

DESCRIPTION OF THE PREFERRED EMBODIMENT

Figure 1A:
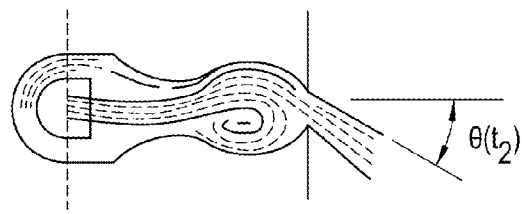
Figure 1B:
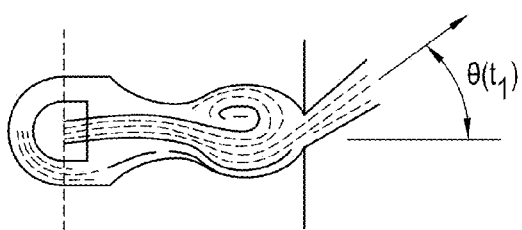
Figure 1C:
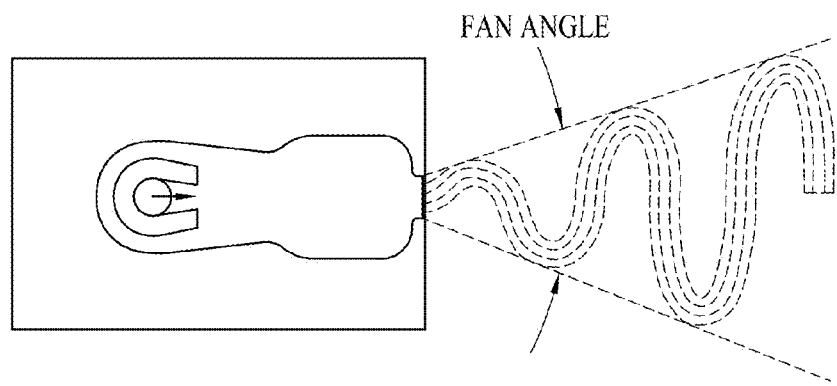
Figure 1D:
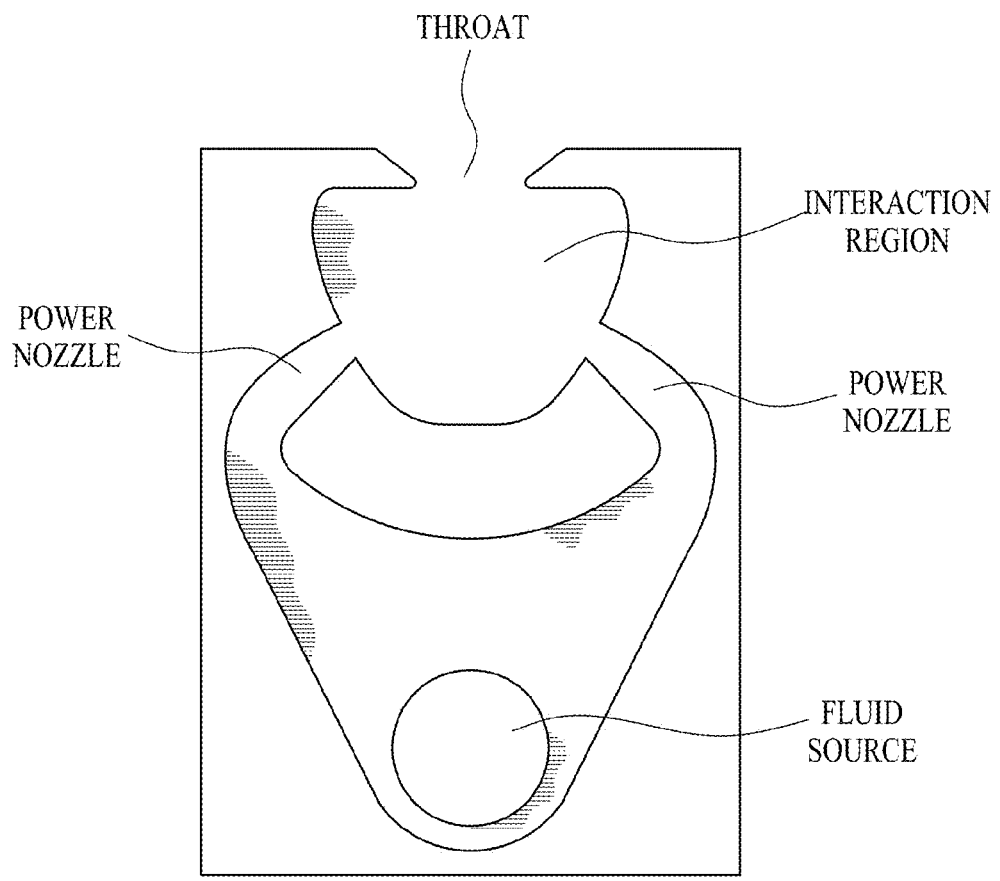
Figure 1E:
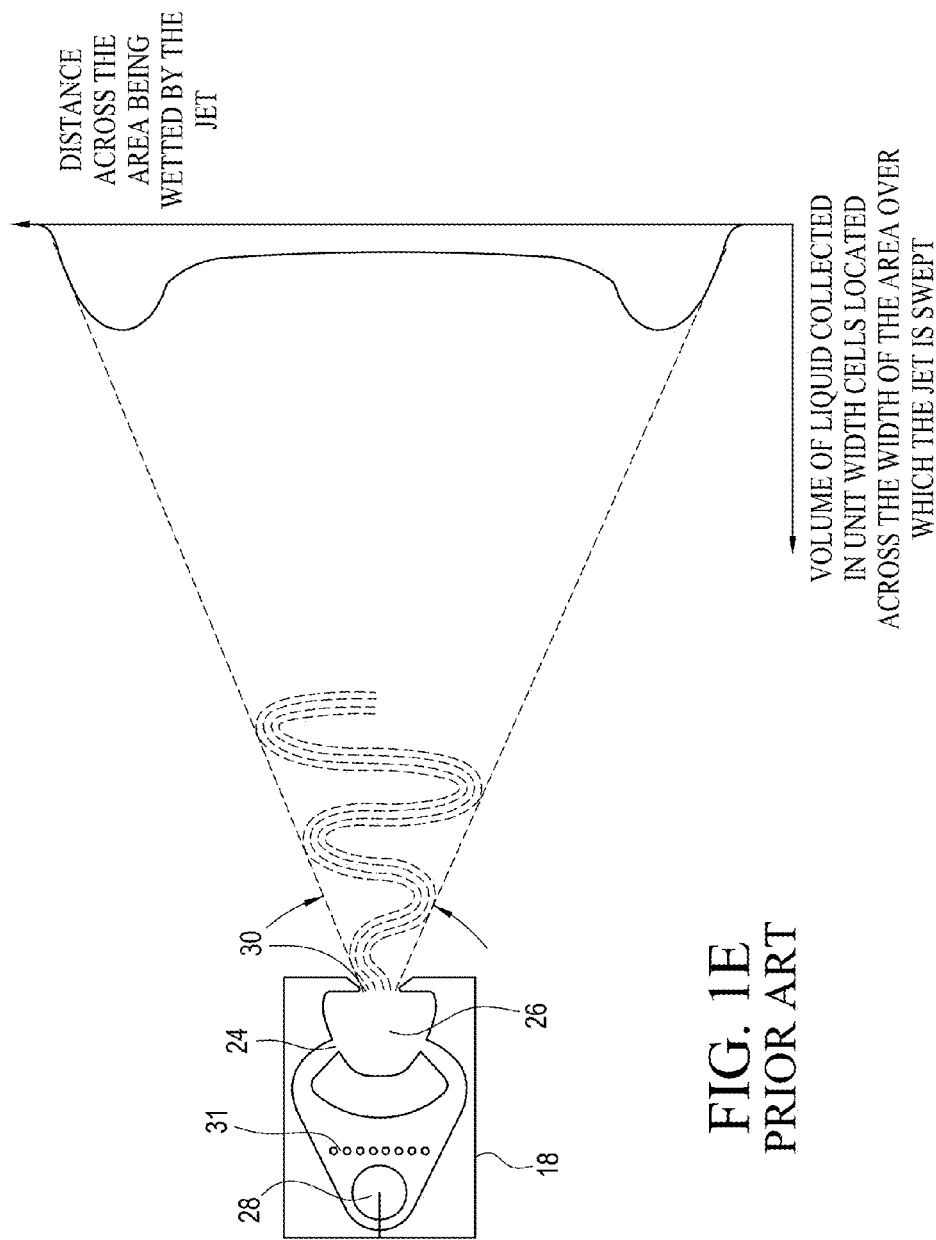
Figure 1F:
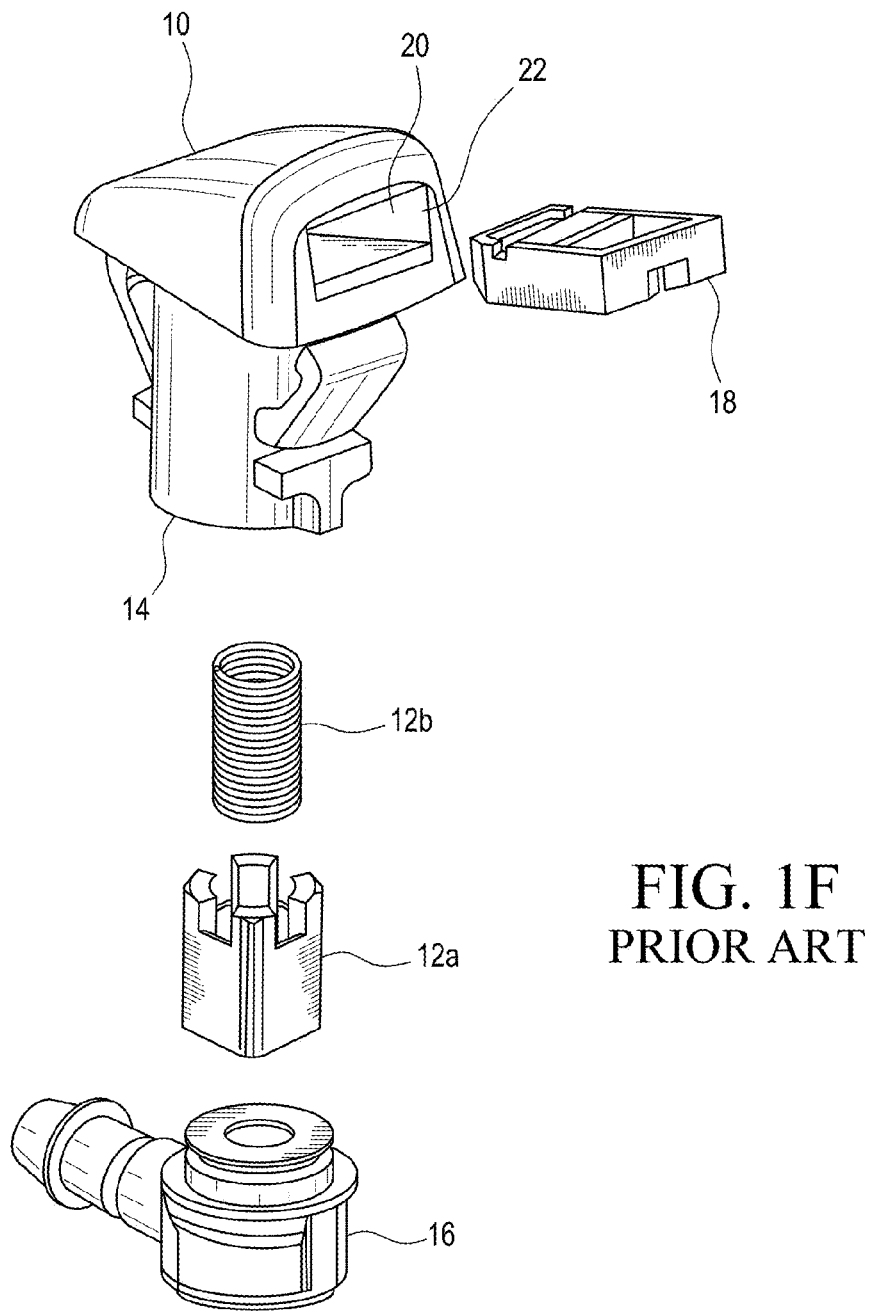

Referring now to FIGS. 1A-8 and 9-12I, new nozzle assembly embodiments are configured with new fluidic oscillator circuits. Fluidic oscillators or fluidic circuits are often configured for use in housings (e.g., as shown in FIG. 1F) which define a channel, port or slot that receives and provides boundaries for the fluid paths defined in the fluidic circuit. For an illustrative example of how a fluidic oscillator or fluidic circuit might be employed, as shown in applicant's U.S. Pat. No. 7,651,036, nozzle assembly 10 is configured with a housing which defines a substantially hollow fluid-impermeable structure with an interior lumen and one or more ports or slots 20, each defining a substantially rectangular passage or aperture with smooth interior slot wall surfaces 22. The interior sidewall surfaces 22 are preferably dimensioned for cost effective fabrication using molding methods and preferably include sidewall grooves positioned and dimensioned to form a "snap fit" with ridges or tabs in a mating fluidic circuit insert (e.g., 18). Nozzle assembly 10 can be configured to include one or more fluidic circuit inserts or chips which are dimensioned to be tightly received in and held by the slot 20 defined within the sidewall of the housing. When fluidic circuit insert 18 is fitted tightly within port or slot 20, the nozzle assembly provides a channel for fluid communication between the housing's interior lumen and the exterior of the housing so that fluid entering the housing's interior lumen may be used to generate an oscillating spray directed distally and aimed by the orientation and configuration of the housing.

The fluidic circuits of the present invention as illustrated in FIGS. 2A-12I operate on a cyclic fluid jet to wall attachment-detachment mechanism resulting in an oscillating jet stream and subsequent spray. Current prototypes of the circuit of the present invention produce a substantially planar spray with a fan angles from 15° to 135°.

The $1^{st}$ embodiment of the fluidic circuit of the present invention 100 as illustrated in FIGS. 2A and 2B has a plurality of sections which cooperate with one another to act upon the flowing fluid passing therethrough to generate a desired oscillating spray. The fluid flows from inlet 110 through the sections described below and is emitted as an oscillating spray of fluid droplets from the throat or outlet 180, and, for purposes of nomenclature, a central or flow axis 102 is defined as a straight line extending from the center of the feed inlet 110 to the center of the throat opening 180. FIG. 2A illustrates, in elevation, a plan view of the structural features fluidic oscillator 100 and FIG. 2B illustrates a side view in elevation and hidden cross section of fluidic oscillator 100 with structural features of FIG. 2A shown in dotted or hidden lines representing a view from a cross section taken along a transverse plane aligned along central axis 102.

In sequence, fluid initially flows into inlet lumen 110 and then flows through interstitial spaces between an array of inwardly projecting post elements 122 defining an optional filtering section 120 and then into a bell shaped feed terminating distally in a power nozzle 150, where the fluid then passes into a fluid jet-steering cavity section 140. The cavity section's jet outlet is the inlet 161 for a vortex generating interaction region 160 which terminates distally in a throat 180 configured to emit an oscillating spray of fluid droplets into the ambient environment. The spray is a substantially planar oscillating fan aimed in the direction of the fluid flow central axis 102 having a selected fan angle width of greater than 60 degrees.

Fluidic circuit 100 is best described in terms of certain features and structural elements configured with specifically selected dimensions, namely, $P_W$=Width of Power Nozzle 150,
$P_D$=Depth of Power Nozzle 150,
Tw=Width of Throat 180,
Td=Depth of Throat 180,
$I_W$=Width of Interaction Region 160,
$I_L$=of Interaction Region 160,
Ew=InterEar Gap Width between Ears 162, 164,
$E_L$=Axial Location of inwardly projecting tips of Ears 162, 164,
Sw=Channel Width at Setback Inlet 161,
$S_L$=Axial Length of Setback Inlet 161 and
$S_A$=Setback Angle Length, or axial length of Interaction region's diverging sidewall segments beginning with Setback Inlet 161.

In operation, pressurized fluid flows into or enters through an inlet 110 or feed hole into the power nozzle 130 which terminates distally in a rectangular opening with a width dimension ("$P_W$") and a depth dimension ("$P_D$"). There is a bell-shaped feed 130 leading to the power nozzle 150 which produces an accelerating fluid jet with a turbulent boundary layer that is desirable to form vortices inside interaction region 160. In this first embodiment, the fluidic circuit power nozzle 150 provides fluid to a jet-steering cavity section 140 which includes a first lateral fluid jet-steering cavity 142 opposite a second fluid jet-steering cavity 144, thus providing a pair of opposing, symmetrical fluid jet-steering cavities 142, 144. The size and shape of the cavities is identical, but mirror imaged and can be configured for varying fluid jet steering performance properties.

Figure 4:
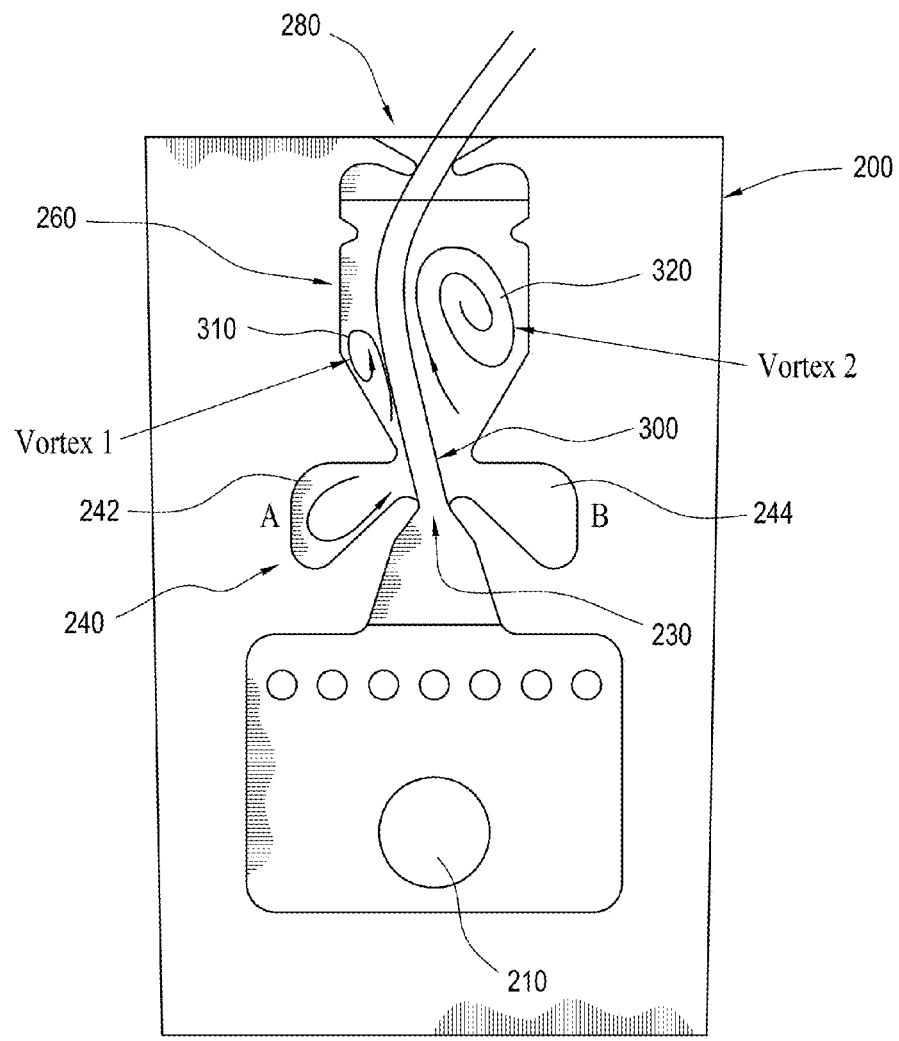
FIG. 4 illustrates, in elevation, the fluidic oscillator with triangular cavities of FIG. 2, showing how circular flow within each cavity generates vortices which induce oscillating instability in the fluid jet, in accordance with the present invention.

Seen in the plan view of FIG. 2A, circular cross section cavities 142, 144 will generate circulating flow within each cavity and the resultant time-varying, colliding flows caused within fluid jet-steering cavity section 140 help steer the resultant fluid jet forced into Interaction Region 160 by inducing an oscillating instability to the fluid which generates first and second vortices within Interaction Region 160 (e.g., like vortices 310, 320, as seen in FIG. 4). An optional lateral fluid channel, trough or slot 146 may connect and provide fluid communication between the cavities 142, 144 below the floor of the fluidic (as best seen in FIG. 2B. Depth of slot 146 is approx. 0.1-0.2 mm below the floor of the circuit 100. One or more slots are not a requirement for the fluidic to cause and maintain oscillation but may be used to make the spray uniform, depending on the application. In many automotive applications, slots (like 146) are not expected to be needed.

The interaction region 160 receives the oscillating jet and the interaction region's interior begins with a narrow channel inlet called a Setback inlet 161, having a selected setback inlet width ("$S_W$"). The flowpath or axial location of Setback Inlet 161 downstream from the power nozzle 150 is called the setback location ("$S_L$") and setback angle length ("$S_A$") may be characterized as the flowpath length (or the axial length along axis 102) for the Interaction region's diverging sidewall segments beginning with setback inlet 161. The setback width or lateral width of setback inlet 161 can be used to optimize the performance of fluidic 100 with a variety of fluids. For example, given a $P_W$ of 0.5 mm (and with no connecting slot 146), inlet width $S_W$ should be greater than 1.35 mm for a bistable operation. For values of $S_W$ less than 1.35 mm, the fluidic 100 will not reliably cause or maintain oscillation, (i.e., fluid flow is monostable). However, with a transverse connecting slot 146, a narrower inlet ($S_W$<1.35 mm) is permissible for bistable operation.

Thus, for bistable (i.e., oscillating vortex) operation, a wider inlet width (Sw>2.7Pw) works for a prototype circuit with no slot and a slightly narrower inlet (Sw>2Pw) works for circuit with a slot 146.

The setback angle length $S_A$ controls the uniformity of the spray, where longer lengths produce a heavy ended spray (similar to that shown in FIG. 1E) while shorter lengths produce a uniform spray. It should be noted that setback length $S_A$ cannot be increased indefinitely and the fluidic's performance tends toward monostable operation for larger values of $S_A$. Applicant's experiments have shown that, generally for $S_A$>4Pw, the fluidic's performance (for circuit 100) becomes undesirably monostable. Preferably, the power nozzle to setback inlet length $S_L$ is slightly more than (e.g., 1.2 times) Pw and is not a critical dimension when compared to Sw and $S_A$.

For the interaction region 160, interaction region width ("$I_W$") and interaction region length ("$I_L$") dimensions configured and sized in relation to the width of power nozzle 150, where $I_W$ is 6.5 times $P_W$ and $I_L$ is typically 11 times $P_W$. These values may be adjusted for packaging constraints. However, dynamic & cold performance are reduced as the size of interaction region 160 is reduced below this nominal set of proportions. As best seen in FIG. 2A, the interaction region 160 also includes a symmetrical pair of opposing inwardly projecting substantially triangular sectioned ears 162, 164, which each project from a wider proximal base and terminate distally in a radiussed tip. Ears 162, 164 are preferably equal in size and are aligned along a transverse axis at a position which is downstream from the setback inlet 161 of interaction region 160. Absence of ears 162, 164 makes the circuit 100 monostable.

Critical dimensions for the opening between the tips of ears 162, 164 ("$E_W$") are:

(a) the lateral width of the inter-ear gap between the inwardly projecting distal ends of the opposing ears, and (b) the axial length of the fluid's path or channel from the power nozzle 150 to the transverse axis of the inwardly projecting ears ("$E_L$").

Applicant's experiments have led to the conclusion that proper oscillating (i.e., bistable, rather than monostable) operation is obtained when $E_W$ is approx. 5.2 times Pw and $E_L$ is in the range of 8.5($P_W$) to 9.2($P_W$).

Figure 3:
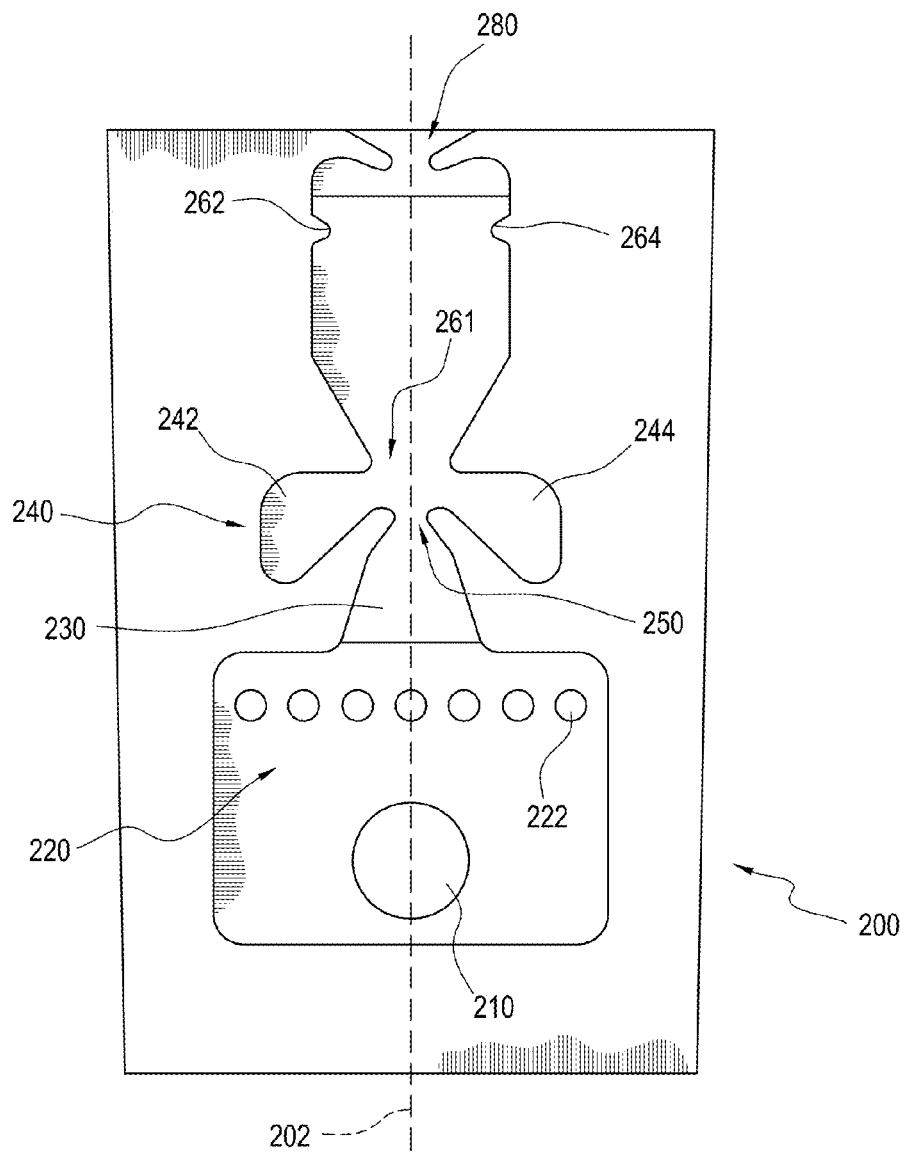
FIG. 3 illustrates, in elevation, an alternative embodiment of a fluidic oscillator with triangular cavities configured to promote circular flow within each cavity and help induce oscillating instability in the fluid jet, in accordance with the present invention.

Referring now to FIG. 3, fluidic circuit 200 is similar to that illustrated in FIGS. 2A and 2B but differs in having triangular section cavities 242, 244. As above, fluidic circuit 200 has a plurality of sections which cooperate with one another to act upon the flowing fluid passing therethrough to generate the desired oscillating spray. In sequence, fluid initially flows into an inlet 210 which passes through an optional filtering section 220 and then into a power nozzle section 230, where fluid then passes into a fluid jet-steering cavity section 240. The cavity section's outlet is the inlet for an interaction region 260 which terminates in a throat 280 configured to emit the oscillating spray into the ambient environment. The fluid flows from inlet 210 through the sections described below and is emitted as an oscillating spray of fluid droplets from the throat or outlet 280, and, for purposes of nomenclature, a central or flow axis 202 is defined as a straight line extending from the center of the feed inlet 210 to the center of the throat opening 280.

In sequence, fluid initially flows into inlet lumen 210 and then flows through interstitial spaces between an array of inwardly projecting post elements 222 defining an optional filtering section 220 and then into a bell shaped feed 230 terminating in a power nozzle 250, where the fluid then passes into a fluid jet-steering cavity section 240. The cavity section's jet outlet 261 is the inlet for a vortex generating interaction region 260 which terminates distally in a throat 280 configured to emit an oscillating spray of fluid droplets into the ambient environment.

Fluidic circuit 200 is best described in terms of similar features and structural elements configured with specifically selected dimensions, namely, $P_W$=Width of Power Nozzle 250,
$P_D$=Depth of Power Nozzle 250,
Tw=Width of Throat 280,
Td=Depth of Throat 280,
$I_W$=Width of Interaction Region 260,
$I_L$=of Interaction Region 260,
Ew=InterEar Gap Width between Ears 262, 264,
$E_L$=Axial Location of inwardly projecting tips of Ears 262, 264,
Sw=Channel Width at Setback Inlet 261,
$S_L$=Axial Length of Setback Inlet 261 and
$S_A$=Setback Angle Length, or axial length of Interaction region's diverging sidewall segments beginning with Setback Inlet 261.

In operation, pressurized fluid flows into or enters through an inlet 210 or feed hole into the bell shaped feed 230 terminating distally in a rectangular power nozzle opening 250 with a width dimension ("$P_W$") and a depth dimension ("$P_D$"). The bell-shaped feed 230 leads to power nozzle 250 and which produces an accelerating fluid jet with a turbulent boundary layer that is desirable to form vortices inside interaction region 260. In this second embodiment, the fluidic circuit power nozzle 250 provides fluid to a jet-steering cavity section 240 which includes a first lateral fluid jet-steering cavity 242 opposite a second fluid jet-steering cavity 244, thus providing a pair of opposing, symmetrical fluid jet-steering cavities 242, 244. The size and substantially triangular shape of the cavities is identical, but mirror imaged and can be configured for varying fluid jet steering performance properties.

Seen in the plan views of FIGS. 3 and 4, triangular cross section cavities 242, 244 will generate circulating flow within each cavity and the resultant time-varying, colliding flows caused within fluid jet-steering cavity section 240 help steer the resultant fluid jet forced into Interaction Region 260 by inducing an oscillating instability to the fluid which generates first and second vortices within Interaction Region 260 (e.g., vortices 310, 320, as seen in FIG. 4). An optional lateral fluid channel, trough or slot may connect and provide fluid communication between the cavities 242, 244 below the floor of the fluidic (not shown, but similar to slot 146 as best seen in FIG. 2B). If included, the depth of the optional lateral slot is approx. 0.1-0.2 mm below the floor of the circuit 200. One or more slots are not a requirement for the fluidic 200 to cause and maintain oscillation but may be used to make the spray uniform, depending on the application. In many automotive applications, slots are not expected to be needed.

The interaction region 260 receives the oscillating jet and the interaction region's interior begins with a narrow channel inlet called a Setback inlet 261, having a selected setback inlet width ("$S_W$"). The flowpath or axial location of Setback Inlet 261 downstream from the power nozzle 250 is called the setback location ("$S_L$") and setback angle length ("$S_A$") may be characterized as the flowpath length (or the axial length along axis 202) for the Interaction region's diverging sidewall segments beginning with setback inlet 261. The setback width or lateral width of setback inlet 261 can be used to optimize the performance of fluidic 200 with a variety of fluids. For example, given a $P_W$ of 0.5 mm (and with no connecting slot 146), inlet width $S_W$ should be greater than 1.35 mm for a bistable operation. For values of $S_W$ less than 1.35 mm, the fluidic 100 will not reliably cause or maintain oscillation, (i.e., fluid flow is monostable). However, with a transverse connecting slot (not shown), a narrower inlet ($S_W$<1.35 mm) is permissible for bistable operation. Thus, for bistable (i.e., oscillating vortex) operation, a wider inlet width (Sw>2.7Pw) works for a prototype circuit with no slot and a slightly narrower inlet (Sw>2Pw) works for circuit with a slot. The setback angle length controls the uniformity of the spray, where longer lengths produce a heavy ended spray (similar to that shown in FIG. 1E) while shorter lengths produce a uniform spray. It should be noted that setback length $S_A$ cannot be increased indefinitely and the fluidic's performance tends toward monostable operation for larger values of $S_A$. Applicant's experiments have shown that, generally for $S_A$>4Pw, the fluidic's performance (for circuit 200) becomes undesirably monostable. Preferably, the power nozzle to setback inlet length $S_L$ is slightly more than (e.g., 1.2 times) Pw and is not a critical dimension when compared to Sw and $S_A$.

For the interaction region 260, interaction region width ("$I_w$") and interaction region length ("$I_L$") dimensions configured and sized in relation to the width of power nozzle 250, where $I_w$ is 6.5 times $P_W$ and $I_L$ is typically 11 times $P_W$. These values may be adjusted for packaging constraints. However, dynamic & cold performance are reduced as the size of interaction region 260 is reduced below this nominal set of proportions. As best seen in FIG. 3, the interaction region 260 also includes a symmetrical pair of opposing inwardly projecting substantially triangular sectioned ears 262, 264, which each project from a wider proximal base and terminate distally in a radiussed tip. Ears 262, 264 are preferably equal in size and are aligned along a transverse axis at a position which is downstream from the setback inlet 261 of interaction region 260. Absence of ears 262, 264 makes the circuit 200 monostable.

As above, critical dimensions for the opening between the tips of ears 262, 264 ("$E_W$") are:

(a) the lateral width of the inter-ear gap between the inwardly projecting distal ends of the opposing ears, and (b) the axial length of the fluid's path or channel from the power nozzle 250 to the transverse axis of the inwardly projecting ears ("$E_L$").

Applicant's experiments have led to the conclusion that proper oscillating operation is obtained when $E_W$ is approx. 5.2 times Pw and $E_L$ is in the range of 8.5($P_W$) to 9.2($P_W$).

Fluidic circuits 100 and 200 each operate on a jet wall attachment/detachment cycle, as illustrated in FIG. 4. With the flowing fluid jet 300 at the center, substantially aligned with the fluidic's central axis (102 or 202), large vortices 310, 320 are formed on both sides and the jet 300 attaches to a wall within interaction region 260. Cavities 242 (or A) and 246 (or B) have periodically varying magnitudes of positive pressure over time. When cavity B momentarily has a higher pressure than opposing cavity A, the jet 300 bends away from higher pressure cavity B. In that instant, fluid from lower pressure cavity A replenishes the vortex 310, which results in jet 300 detaching from the interaction region sidewall segment adjacent to the replenishing cavity and moving across and then attaching to the other sidewall segment adjacent the opposite cavity. Pressure builds in cavity A until it is greater than pressure in cavity B. The pressure differential causes the jet 300 to detach from the interaction region sidewall segment adjacent cavity A and attach to the interaction region sidewall segment adjacent cavity B. The cycle then continues as pressure increases in cavity B, resulting in an oscillating bistable jet 300 which contributes to generation of an oscillating spray from the throat (180 or 280), when using typical windshield washing fluid.

The longer the setback angle length $S_A$, the longer jet 300 dwells at each wall (A side or B side) resulting in a "heavy ended" spray from the throat 280. The inwardly projecting opposing ears (e.g., 262, 264) enable the bistability of the jet oscillation. In absence of the ears, vortex 310 is large (extending the entire length of the interaction region 260) and cannot be adequately replenished, resulting in no wall detachment and monostable operation. Critical ear configuration and placement values ($E_W$ and $E_L$) are chosen to optimize cold performance characteristics, (i.e. bistable operation even with washer fluids of higher viscosity). Generally this ranges from 50% methanol-50% water (9 cP) to 50% ethanol-50% water mix (22 cP). Similarly, critical setback dimensions Sw and Sa are chosen for optimized cold performance.

Turning now to FIGS. 5, 6A and 6B, an alternative embodiment fluidic circuit 400 provides a useful alternative with certain improvements over the circuit 100, 200 illustrated in FIGS. 2A, 2B, 3 and 4. Fluidic circuit 400 has first and second islands 442, 444 introduced into fluid jet steering section 440 as shown in FIG. 5 and first and second islands 442, 444 have an associated dimension called the island width ("$I_{SW}$"). In the illustrated configuration, circuit 400 is referred to as the "owl" circuit because of its resemblance to an owl. Fluidic circuit 400 is operationally similar to those illustrated in FIGS. 2A-4 and has a plurality of sections which cooperate with one another to act upon the flowing fluid passing therethrough to generate the desired oscillating spray. In sequence, fluid initially flows into an inlet 410 which passes through an optional filtering section 420 and then into a power nozzle section 430, where fluid then passes into the fluid jet-steering island section 440. The island section's outlet is the inlet for interaction region 460 which terminates in a throat 480 configured to emit the oscillating spray into the ambient environment. FIG. 5 illustrates, in elevation, a plan view of the structural features fluidic oscillator 400 which also has a central or flowpath axis 402.

In sequence, fluid initially flows into inlet lumen 410 and then flows through interstitial spaces between an array of inwardly projecting post elements 422 defining an optional filtering section 420 and then into a bell shaped feed terminating distally in a power nozzle 450, where the fluid then passes into a fluid jet-steering section 440. The jet steering section's jet outlet is the inlet 461 for a vortex generating interaction region 460 which terminates distally in throat 480 which is configured to emit an oscillating spray of fluid droplets into the ambient environment.

Fluidic circuit 400 is best described in terms of certain features and structural elements configured with specifically selected dimensions, namely, $P_W$=width of power nozzle 450, $P_D$=depth of power nozzle 450, Tw=width of throat 480, Td=depth of throat 480, $I_W$=transverse width of interaction region 460, $I_L$=axial length of interaction region 460, $I_{SW}$=separation width between islands 442, 444

Ew=inter-ear gap width between ears 462, 464, $E_L$=axial location of inwardly projecting tips of ears 462, 464, Sw=channel width at Setback Inlet 461, $S_L$=axial length of setback inlet 461 and $S_A$=setback angle length, or axial length of interaction region's diverging sidewall segments beginning with Setback Inlet 461.

Pressurized fluid flows into or enters through an inlet 410 or feed hole into the power nozzle 450 which is preferably a rectangular opening with a width dimension ("$P_W$") and a depth dimension ("$P_D$"). There is a bell-shaped feed 430 leading to the power nozzle 450 which produces an accelerating fluid jet with a turbulent boundary layer that is desirable to form vortices inside interaction region 460. In this embodiment, the fluidic circuit power nozzle 450 provides fluid to a jet-steering section 440 which includes a first laterally offset fluid jet-steering island 442 opposite a second fluid jet-steering island 444, thus providing a pair of opposing, symmetrical fluid jet-steering islands 442, 444 separated by a central opening defined by the island separation width ("$I_{SW}$"). The size and shape of the islands is identical, but mirror imaged and can be configured for varying fluid jet steering performance properties.

As best seen in the plan view of FIG. 5, a first island 442 is laterally offset from central axis 402 along the fluid flow path and spaced from a first curved fluid jet steering interaction region sidewall segment 452 which defines a first jet steering lumen and extends from a first side the power nozzle 450 to a first side of the inlet of the interaction region 460 and is contiguous with a first angled sidewall segment of the interaction region 460. Symmetrically, a second island 444 is laterally offset from central axis 402 along the fluid flow path and spaced from a second curved fluid jet steering interaction region sidewall segment 454 which defines a second jet steering lumen and extends from a second side of power nozzle 450 to the inlet of a second side the interaction region 460 and is contiguous with a second angled sidewall segment of the interaction region 460 which thereby defines an oscillation chamber. Fluid jet steering section 440 thus comprises a first fluid jet steering lumen proximate first island 442 which defines a first fluid pressure accumulating volume opposite the second fluid jet steering lumen proximate second island 444 to define a second fluid pressure accumulating volume. The first fluid jet steering lumen and said second fluid jet steering lumen are thus in fluid communication with one another and with power nozzle 450, and the fluid jet steering section 440 is in fluid communication with and emits a fluid jet into the oscillation inducing interaction region 460 which functions as an oscillation chamber.

As illustrated in the plan view of FIG. 5, Islands 442, 444 and the first and second jet steering lumens they define will generate circulating flow within each jet steering lumens and the resultant time-varying, colliding flows caused within fluid jet-steering cavity section 440 help steer the resultant fluid jet forced into Interaction Region 460 by inducing an oscillating instability to the fluid which generates first and second vortices within Interaction Region 460 (e.g., resembling vortices 310, 320, as seen in FIG. 4).

The interaction region 460 receives the oscillating jet and the interaction region's interior begins with a narrowed channel inlet called a Setback inlet 461, having a selected setback inlet width ("$S_W$"). The flowpath or axial location of Setback Inlet 461 downstream from the power nozzle 450 is called the setback location ("$S_L$") and setback angle length ("$S_A$") may be characterized as the flowpath length (or the axial length along axis 402) for the Interaction region's angled or diverging first and second sidewall segments beginning with setback inlet 461. The setback width or lateral width of setback inlet 461 can be used to optimize the performance of fluidic 400 with a variety of fluids. For example, given a $P_W$ of 0.5 mm and with no connecting slot (e.g. such as transverse slot 146 described for fluidic 100, above), inlet width $S_W$ should be greater than 1.35 mm for a bistable operation. For values of $S_W$ less than 1.35 mm, the fluidic 400 will not reliably cause or maintain oscillation, (i.e., fluid flow is monostable). However, with a transverse connecting slot 146, a narrower inlet ($S_W$<1.35 mm) is permissible for bistable operation. Thus, for bistable (i.e., oscillating vortex) operation, a wider inlet width (Sw>2.7Pw) works for a prototype circuit with no slot and a slightly narrower inlet (Sw>2Pw) works for circuit with a slot (e.g., 146). The setback angle length controls the uniformity of the spray, where longer lengths produce a heavy ended spray (similar to that shown in FIG. 1E) while shorter lengths produce a uniform spray. It should be noted that setback length $S_A$ cannot be increased indefinitely and the fluidic's performance tends toward monostable operation for larger values of $S_A$. Applicant's experiments have shown that, generally for $S_A$>4Pw, the fluidic's performance (for circuit 100) becomes undesirably monostable. Preferably, the power nozzle to setback inlet length $S_L$ is slightly more than (e.g., 1.2 times) Pw and is not a critical dimension when compared to Sw and $S_A$.

Figure 5:
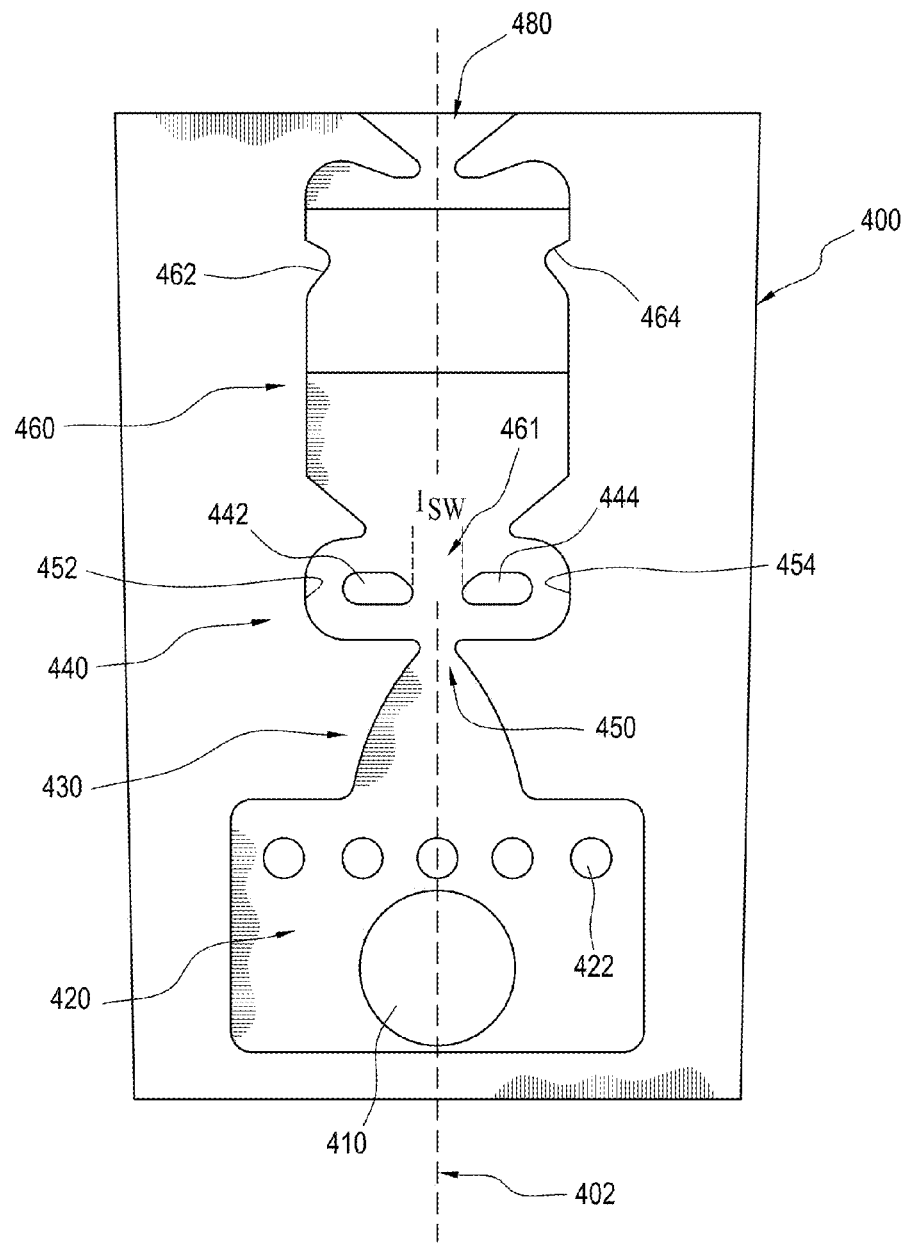
FIG. 5 illustrates, in elevation, another embodiment of a fluidic oscillator circuit (the "owl" circuit) with Island features having a selected width to promote circular flow within each cavity and help induce oscillating instability in the fluid jet, in accordance with the present invention.

For the interaction region 460, interaction region width ("$I_W$") and interaction region length ("$I_L$") dimensions configured and sized in relation to the width of power nozzle 450, where $I_W$ is 6.5 times $P_W$ and $I_L$ is typically 11 times $P_W$. These values may be adjusted for packaging constraints. However, dynamic & cold performance are reduced as the size of interaction region 460 is reduced below this nominal set of proportions. As best seen in FIG. 5, the interaction region 460 also includes a symmetrical pair of opposing inwardly projecting substantially triangular sectioned ears 462, 464, which each project from a wider proximal base and terminate distally in a radiussed tip. Ears 462, 464 are preferably equal in size and are aligned along a transverse axis at a position which is downstream from the setback inlet 461 of interaction region 460. Absence of ears 462, 464 makes the circuit 400 monostable.

Critical dimensions for the opening between the tips of ears 462, 464 ("$E_W$") are:

(a) the lateral width of the inter-ear gap between the inwardly projecting distal ends of the opposing ears, and (b) the axial length of the fluid's path or channel from the power nozzle 450 to the transverse axis of the inwardly projecting ears ("$E_L$").

Applicant's experiments have led to the conclusion that proper oscillating operation is obtained when $E_W$ is approx. 5.2 times Pw and $E_L$ is in the range of 8.5($P_W$) to 9.2($P_W$).

In the illustrated embodiment for circuit 400, proper operation was confirmed when the following relationships were maintained: Isw=1.2Pw–1.3Pw and Sw=3.5Pw–3.8Pw.

Figure 6B:
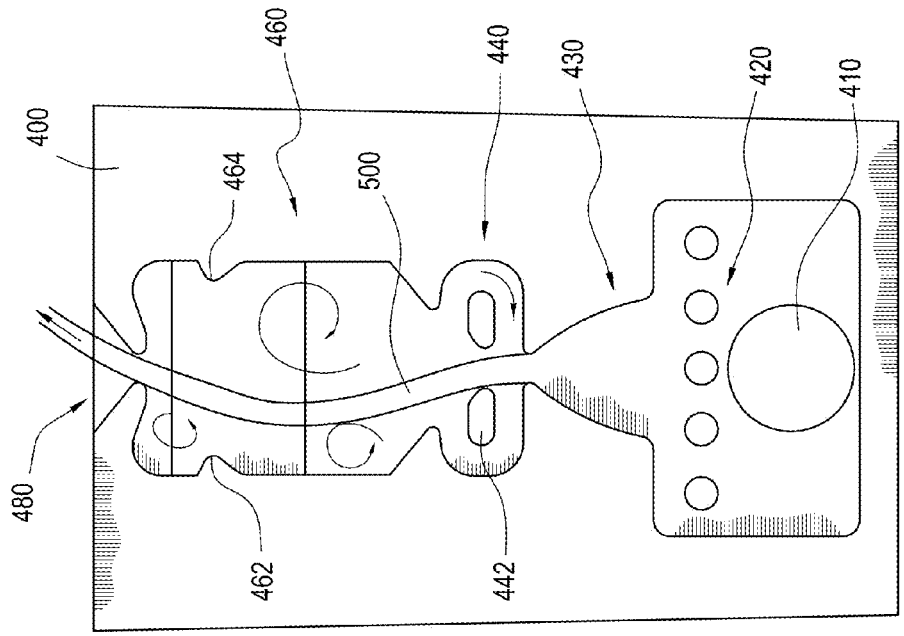
FIG. 6B illustrates, in elevation, the fluidic oscillator with island features of FIGS. 4 and 5A, showing how alternating entrainment directions for a fluid jet generates flows which cause the central flow of the jet to oscillate toward a second (e.g., left) side of the chamber, in accordance with the present invention.
Figure 6A:
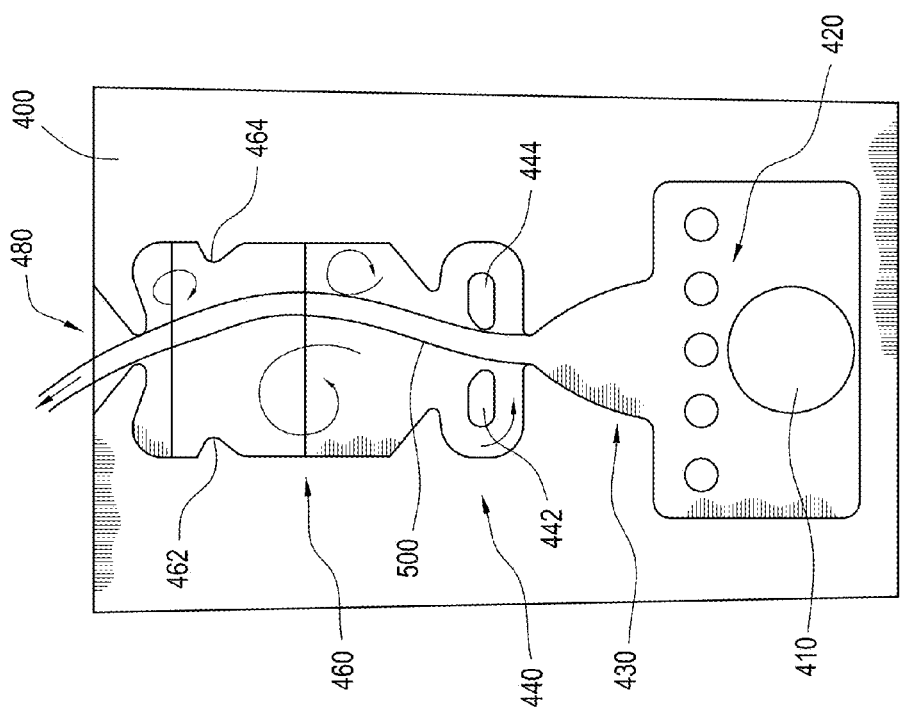
FIG. 6A illustrates, in elevation, the fluidic oscillator with island features of FIG. 4, showing how alternating entrainment directions for a fluid jet generates flows which cause the central flow of the jet to oscillate toward a first (e.g., right) side of the chamber, in accordance with the present invention.

For the embodiment of FIGS. 5-6B, Since Isw is slightly larger than Pw, the jet 500 sets up entrainment along the channels as illustrated in time sequenced views FIGS. 6A and 6B. Entrainment alternates from each side and jet 500 moves from one wall to another resulting in an oscillating output. Note that the relative size and shape of the cavity-like jet steering lumens in section 440 have been reduced from the triangular cavities in the comparable jet steering section 240 for fluidic 200, as illustrated in FIG. 3.

Turning now to the nozzle assembly insert embodiment illustrated in FIGS. 7A, 7B and 7C, a two-sided fluidic circuit substrate, insert or chip 600 is configured with a first oscillator configuration 700 defined within the surface of a first side and a second oscillator configuration 800 defined within the opposing surface of a second side of fluidic circuit insert 600, opposite the first side of fluidic circuit insert 600. The mushroom fluidic circuit oscillator 700 and the owl fluidic circuit oscillator 800 are combined into a single solid chip on opposing sides of chip substrate 600 to produce a fluidic oscillator insert for use in double-spray nozzle assembly. The sprays produced by the circuits 700, 800 can be selected to differ, and complement one another. For example the mushroom fluidic circuit 700 can produce a spray having a 60° fan angle or spray width while the owl fluidic circuit 800 is configured to simultaneously generate a spray having a 45° fan angle to accommodate the shape of a vehicle's windshield or another desired target surface, depending on the desired spray pattern. The feed hole or inlet 710 is preferably located on the side of the insert 600 carrying the mushroom fluidic circuit and an elongated slot-shaped inlet 810 is defined through the substrate of chip 600 to provide shared fluid communication with incoming pressurized fluid so that both fluidic circuits can be supplied with pressurized fluid flow from a common source, simultaneously.

Turning now to FIG. 8, a split throat owl circuit fluidic 900 has a throat aperture 980 configured with an inwardly projecting splitter member 982. Like the "Owl circuit 400, fluidic circuit 900 has first and second islands 942, 944 introduced into fluid jet steering section 940 as shown in FIG. 8 and first and second islands 942, 944 are spaced apart by a transverse gap or island separation width ("$I_{SW}$"). In the illustrated configuration, circuit 900 is operationally similar to those illustrated in FIGS. 5-6B and has a plurality of sections which cooperate with one another to act upon the flowing fluid passing therethrough to generate the desired oscillating spray. In sequence, fluid initially flows into inlet 910 and passes through an optional filtering section 920 and then into a tapered inlet section 930 terminating in power nozzle 950, where fluid then passes into the fluid jet-steering island section 940. The island section's outlet is the inlet for interaction region 960 which terminates in a throat 980 configured to emit the oscillating spray into the ambient environment. FIG. 8 illustrates, in elevation, a plan view of the structural features fluidic oscillator 900 which also has a central or flowpath axis 902.

In sequence, fluid initially flows into inlet lumen slot 910 and then flows through interstitial spaces between the array of inwardly projecting post elements 922 defining optional filtering section 920 and then into a bell shaped feed terminating distally in a power nozzle 950, where the fluid then passes into a fluid jet-steering section 940. The jet steering section's jet outlet is the inlet 961 for a vortex generating interaction region 960 which terminates distally in split throat 980 which is configured to emit an oscillating spray of fluid droplets into the ambient environment.

Fluidic circuit 900 is best described in terms of certain features and structural elements configured with specifically selected dimensions, namely, $P_W$=width of power nozzle 950,
$P_D$=depth of power nozzle 950,
Tw=width of split throat 980,
Td=depth of throat 980,
$I_W$=transverse width of interaction region 960,
$I_L$=axial length of interaction region 960,
$I_{SW}$=separation width between islands 942, 944
Ew=inter-ear gap width between ears 962, 964,
$E_L$=axial location of inwardly projecting tips of ears 962, 964,
Sw=channel width at Setback Inlet 961,
$S_L$=axial length of setback inlet 961 and $S_A$=setback angle length, or axial length of interaction region's diverging sidewall segments beginning with Setback Inlet 961.

Pressurized fluid flows into or enters through an inlet 910 or feed hole into the power nozzle 450 which is preferably a rectangular opening with a width dimension ("$P_W$") and a depth dimension ("$P_D$"). Bell-shaped feed 930 leads to the power nozzle 950 which produces an accelerating fluid jet with a turbulent boundary layer that is desirable to form vortices inside interaction region 960. In this embodiment, the fluidic circuit power nozzle 950 provides fluid to jet-steering section 940 which includes a first laterally offset fluid jet-steering island 942 opposite a second fluid jet-steering island 944, thus providing a pair of opposing, symmetrical fluid jet-steering islands 942, 944 separated by a central opening defined by the island separation width ("$I_{SW}$"). The size and shape of the islands is identical, but mirror imaged and the islands can be configured for varying fluid jet steering performance properties.

First island 942 is laterally offset from central axis 902 along the fluid flow path and spaced from a first curved fluid jet steering interaction region sidewall segment 952 which defines a first jet steering lumen and extends from a first side the power nozzle 950 to a first side of the inlet of the interaction region 960 and is contiguous with a first angled sidewall segment of the interaction region 960. Symmetrically, a second island 944 is laterally offset from central axis 902 along the fluid flow path and spaced from a second curved fluid jet steering interaction region sidewall segment 954 which defines a second jet steering lumen and extends from a second side of power nozzle 950 to the inlet of a second side the interaction region 960 and is contiguous with a second angled sidewall segment of the interaction region 960 which thereby defines an oscillation chamber. Fluid jet steering section 940 thus comprises a first fluid jet steering lumen proximate first island 942 which defines a first fluid pressure accumulating volume opposite the second fluid jet steering lumen proximate second island 944 to define a second fluid pressure accumulating volume. The first fluid jet steering lumen and said second fluid jet steering lumen are thus in fluid communication with one another and with power nozzle 950, and the fluid jet steering section 940 is in fluid communication with and emits a fluid jet into the oscillation inducing interaction region 960 which functions as an oscillation chamber.

Seen in the plan view of FIG. 8, Islands 942, 944 and the first and second jet steering lumens they define will generate circulating flow within each jet steering lumens and the resultant time-varying, colliding flows caused within fluid jet-steering cavity section 940 help steer the resultant fluid jet forced into Interaction Region 960 by inducing an oscillating instability to the fluid which generates first and second vortices within Interaction Region 960 (e.g., resembling vortices 310, 320, as seen in FIG. 4).

The interaction region 960 receives the oscillating jet and the interaction region's interior begins with a narrowed channel inlet called a Setback inlet 961, having a selected setback inlet width ("$S_W$"). The flowpath or axial location of Setback Inlet 961 downstream from the power nozzle 950 is called the setback location ("$S_L$") and setback angle length ("$S_A$") may be characterized as the flowpath length (or the axial length along axis 902) for the Interaction region's angled or diverging first and second sidewall segments beginning with setback inlet 961. The setback width or lateral width of setback inlet 961 can be used to optimize the performance of fluidic 900 with a variety of fluids. For example, given a $P_W$ of 0.5 mm and with no connecting slot (e.g. such as transverse slot 146 described for fluidic 100, above), inlet width $S_W$ should be greater than 1.35 mm for a bistable operation. For values of $S_W$ less than 1.35 mm, the fluidic 400 will not reliably cause or maintain oscillation, (i.e., fluid flow is monostable). However, with a transverse connecting slot (e.g., like 146, but not shown), a narrower inlet ($S_W$<1.35 mm) is permissible for bistable operation. Thus, for bistable (i.e., oscillating vortex) operation, a wider inlet width (Sw>2.7Pw) works for a prototype circuit with no slot and a slightly narrower inlet (Sw>2Pw) works for circuit with a slot (e.g., 146). The setback angle length controls the uniformity of the spray, where longer lengths produce a heavy ended spray (similar to that shown in FIG. 1E) while shorter lengths produce a uniform spray. It should be noted that setback length $S_A$ cannot be increased indefinitely and the fluidic's performance tends toward monostable operation for larger values of $S_A$. Applicant's experiments have shown that, generally for $S_A$>4Pw, the fluidic's performance (for circuit 900) becomes undesirably monostable. Preferably, the power nozzle to setback inlet length $S_L$ is slightly more than (e.g., 1.2 times) Pw and is not a critical dimension when compared to Sw and $S_A$.

For the interaction region 960, interaction region width ("$I_w$") and interaction region length ("$I_L$") dimensions configured and sized in relation to the width of power nozzle 450, where $I_w$ is 6.5 times $P_W$ and $I_L$ is typically 11 times $P_W$. These values may be adjusted for packaging constraints. However, dynamic & cold performance are reduced as the size of interaction region 960 is reduced below this nominal set of proportions. The interaction region 960 also includes a symmetrical pair of opposing inwardly projecting substantially triangular sectioned ears 962, 964, which each project from a wider proximal base and terminate distally in a radiussed tip. Ears 962, 964 are preferably equal in size and are aligned along a transverse axis at a position which is downstream from the setback inlet 961 of interaction region 960. Absence of ears 962, 964 makes the circuit 900 monostable.

Critical dimensions for the opening between the tips of ears 962, 964 ("$E_W$") are:

(a) the lateral width of the inter-ear gap between the inwardly projecting distal ends of the opposing ears, and (b) the axial length of the fluid's path or channel from the power nozzle 450 to the transverse axis of the inwardly projecting ears ("$E_L$").

Applicant's experiments have led to the conclusion that proper oscillating operation is obtained when $E_W$ is approx. 5.2 times Pw and $E_L$ is in the range of 8.5($P_W$) to 9.2($P_W$).

In the illustrated embodiment for circuit 400, proper operation was confirmed when the following relationships were maintained: Isw=1.2Pw-1.3Pw and Sw=3.5Pw-3.8Pw.

For the embodiment of FIG. 8, the movement of the jet can be compared to that illustrated in FIGS. 6A and 6B, Since Isw is slightly larger than Pw, the jet (e.g., 500) sets up entrainment along the channels (as illustrated in time sequenced views FIGS. 6A and 6B). Entrainment alternates from each side and jet (e.g., like 500) moves from one wall to another resulting in an oscillating output. Note that the relative size and shape of the cavity-like jet steering lumens in section 940 have been reduced from the triangular cavities in the comparable jet steering section 240 for fluidic 200, as illustrated in FIG. 3, but are comparable to those shown in FIGS. 5-6B.

Split throat owl fluidic circuit 900 can be used with a splitter at the throat for sprays with larger fan angles. Generally, for sprays with larger fan angles (e.g., >60°) the fluidic configuration of FIG. 8 may be preferred for higher circuit efficiency. Circuit efficiency is proportional to fan angle for a given throat to power nozzle area ratio. Thus circuit efficiency equates to higher velocity at a specified fan angle and pressure. Especially for windshield washer applications, in addition to larger drops, higher velocity is desirable.

Persons of skill in the art will appreciate that the embodiments described and illustrated thus far provides a fluidic circuit (e.g., 100, 200, 400, 800 or 900) adapted for use in a nozzle assembly and configured to spray an oscillating pattern of fluid droplets, comprising a source of fluid under pressure (not shown), a fluidic oscillator (e.g., 100, 200, 400, 800 or 900) having an inlet in fluid communication with the source and including a power nozzle, said oscillator further including an oscillation chamber having an upstream end with an inlet coupled to said power nozzle for issuing a jet of fluid into the oscillation chamber and a downstream end having an outlet aperture or orifice (e.g., 180, 280, 480) for issuing a jet of fluid into ambient space. The oscillation chamber has a fluid jet steering section (e.g. 140, 240, 440 or 940) in fluid communication with the power nozzle and having a first fluid pressure accumulating volume opposite a second fluid pressure accumulating volume, each in fluid communication with one another and with the power nozzle, where the fluid jet steering section is in fluid communication with and emits a fluid jet into an oscillation inducing interaction region. The oscillator further includes opposing first and second side walls which intersect opposing the top and bottom walls to define the oscillation inducing interaction region in the oscillation chamber for causing the jet of fluid to rhythmically sweep back and forth between the sidewalls in the oscillation chamber, and the oscillation inducing interaction region defines the throat width and the power nozzle width, while the upstream end comprises a tapering or narrowing (preferably bell-shaped) feed (e.g., 130, 230, 430) that promotes the spreading of the jet as it leaves the power nozzle; wherein the interaction region and the fluid jet steering section are quickly filled with fluid from said source and the fluidic oscillator is activated to provide a bistable, oscillating spray.

The fluidic nozzle oscillation chamber's interaction region preferably includes opposing ear-shaped protuberances (e.g., 162, 164) projecting inwardly from the opposing first and second side walls, and the oscillation chamber's fluid jet steering section may comprise a first cavity (e.g., 142 or 242) defining a first fluid pressure accumulating volume opposite a second cavity (e.g., 144 or 244) defining a second fluid pressure accumulating volume, where the first cavity and the second cavity are in fluid communication with one another and with the power nozzle. The fluid jet steering section may have first and second opposing jet steering lumens or channels defined around first and second islands (442, 444) to provide fluid pressure accumulating volumes (instead of opposing cavities). The fluid jet steering section is in fluid communication with and emits a fluid jet into an oscillation inducing interaction region. The first cavity defining the first fluid pressure accumulating volume may be configured with a substantially circular cross section (e.g., 142) or with a substantially triangular cross section (e.g., 242).

Referring now to FIGS. 9, 10A and 10B, alternate preferred embodiments include "cavityless" fluidic circuits (e.g. double bowl fluidic circuit 1100) which also operate on a cyclic fluid jet to wall attachment-detachment mechanism resulting in an oscillating jet stream and subsequent spray. FIG. 9 illustrates a double bowl fluidic oscillator 1100 having no cavities in interaction region 1160 which is configured to promote rotating flow and formation of circulating vortices between the laterally opposed bowl-shape defining or diverging wall segments within interaction region 1160. The vortices form, grow and move distally toward the throat orifice 1180 and the unstable nature of those rotating flows induce oscillating instability in the fluid jet flowing through power nozzle 1150 and issuing from throat orifice 1180, in accordance with the present invention.

As illustrated in FIG. 9, interaction region 1160 is defined symmetrically around central axis 1102 and fluid flowing from inlet 1110 and through power nozzle aperture 1150 toward outlet throat 1180 encounters the expanding cross sectional area presented by the region between the laterally opposed diverging wall segments 1142, 1144 which diverge along the central flow axis 1102 at an included angle (between opposing diverging walls 1142 and 1144) of less than 60 degrees and, preferably 30-40 degrees. By testing prototypes, applicants have observed that improved spray velocity (as high as 10 meters per second with water) and cold performance is obtained with this interaction region configuration. Fluidic circuit 1100 develops circulating vortices in the downstream wider portion (defined between curved opposing sidewall segments 1142B, 1144B) of the interaction region 1160, and the flowing fluid's jet is steered by alternately attaching to and detaching from each of the laterally opposing diverging wall segments, and the circulating, moving vortices force the fluid jet to displace laterally moving in a lateral oscillation (in a manner similar to that illustrated in and described for the embodiment of FIG. 4.)

Improved fluidic oscillator 1100 may be readily configured for insertion into a nozzle housing (e.g., 10) to provide an improved nozzle configured to spray an oscillating pattern of fluid droplets once connected to and supplied by a source of fluid under pressure. Fluidic oscillator 1100 is preferably defined in a fluid impermeable substrate and having an inlet 1110 in fluid communication with the source and including a power nozzle 1150 in fluid communication with oscillation chamber 1160 having an upstream end with an inlet coupled to power nozzle 1150 for issuing a jet of fluid into oscillation chamber 1160 and a downstream end having an outlet aperture 1180 for issuing the jet of fluid (e.g., like 300 or 500) into ambient space. Oscillation chamber 1160 defines a fluid jet steering section in fluid communication with power nozzle 1150 and having a first fluid jet steering sidewall feature 1142B defined in left sidewall 1142 opposite a second fluid jet steering sidewall feature 1144B defined in right sidewall 1144, each in fluid communication with one another and with power nozzle 1150, so the fluid jet steering section is in fluid communication with and emits a fluid jet into the oscillation inducing interaction region.

As with the fluidic geometries described above, oscillator 1100 further includes and opposing first and second side walls which intersect opposing top and bottom walls to define the oscillation inducing interaction region in the oscillation chamber, and the opposing first and second sidewalls 1142, 1144 diverge in linear wall segments which then diverge in arcuate or concave symmetrical round bowl-shaped segments (e.g., curved opposing sidewall segments) which define laterally opposing first and second setback features 11428, 11448 for causing a jet attached to the wall to detach and thereby cause the jet of fluid to develop alternating (left and right side) circulating vortices which grow (in circulation diameter) and move distally toward exit throat 1180 and thus force the fluid jet to rhythmically sweep back and forth between those sidewalls in the oscillation chamber. Oscillation inducing interaction region 1160 defines a throat width $T_W$ and a power nozzle width $P_W$ and the oscillation chamber's upstream end comprises a bell-shaped feed 1130 that promotes the spreading of the jet as it leaves the power nozzle 1150.

In use, interaction region 1160 and particularly fluid jet steering section 1140 are quickly filled with fluid from the inlet 1110 and fluidic oscillator 1100 is activated to generate a bistable oscillating spray of droplets in a selected fan pattern. Fluid jet vortex creation and movement are enhanced by opposing ear-shaped protuberances 1162 and 1164 which projecting inwardly from the opposing first and second side walls to create jet steering vortices. The sidewalls of interaction region 1160 terminate distally with symmetrical opposing semi-cylindrical sidewall sections 1172, 1174 which are configured to receive each side's vortices, once they have traveled distally past the ears 1162, 1164.

For purposes of providing a definite nomenclature, it is noted that FIG. 9 illustrates that the oscillation chamber's fluid jet steering section 1140 includes first diverging sidewall segment 1142 which defines a first proximate fluid jet attachment surface terminating distally in a first setback feature 1142B which is symmetrically configured around central axis 1102 and opposite a second proximate fluid jet attachment surface 1144 terminating distally in a second setback feature 1144B. And the first proximate fluid jet attachment surface 1142 and second proximate fluid jet attachment surface 1144 are in fluid communication with one another and with power nozzle 1150, so that the fluid jet steering section 1140 is in fluid communication with and emits a fluid jet into the oscillation inducing interaction region.

FIGS. 10A and 10B are photographs of a prototype cavityless fluidic oscillator configured with transparent wall sections (i.e., meaning one can see the momentary position of the fluid jet and vortices created within the interaction chamber) in accordance with the present invention and these photographs illustrate the creation of the vortices which advantageously steer the fluid jet flowing therethrough.

Turning now to FIGS. 11 and 12A-12I, a slot-bump fluidic circuit 1200 is illustrated which also operates on a cyclic fluid jet to wall attachment-detachment mechanism resulting in an oscillating jet stream and subsequent spray. Current prototypes of the circuit of the present invention produce a sprayed jet 1300J which oscillates to generate substantially planar spray pattern of transient ballistic droplets which project distally within a selected fan angle which may be (depending on fluidic geometry) from 15 degrees to 135 degrees.

The slot-bump fluidic circuit 1200 as illustrated in FIGS. 11 and 12A-12I has a plurality of sections which cooperate with one another to act upon the flowing fluid passing therethrough to generate a desired oscillating spray. The fluid flows from inlet 1210 through the sections described below and is emitted as an oscillating spray of fluid droplets 1300J from the throat or outlet orifice 1280, and, for purposes of nomenclature, a central or flow axis 1202 is defined as a straight line extending from the center of the feed inlet 1210 to the center of the throat opening 1280. FIG. 11 illustrates, in elevation, a plan view of the structural features fluidic oscillator 1200.

In sequence, fluid initially flows into inlet lumen 1210 and then (preferably) flows through interstitial spaces between an array of inwardly projecting post elements 1222 defining an optional filtering section 1220 and then into a bell shaped feed 1230 terminating distally in a power nozzle 1250, where the fluid then passes into a fluid jet-steering attachment wall section 1240 which defines an expanding cross sectional area through which the fluid (including fluid jet 1300 flows). Attachment wall section 1240 comprised region between the laterally opposed diverging wall segments 1242, 1244 which diverge along the central flow axis 1202 at an included acute sidewall to sidewall divergence angle (between opposing diverging walls 1242 and 1244) of less than 60 degrees and, preferably 40 degrees, meaning the preferred angle $I_A$ between each diverging sidewall and central axis 1202 is 20 degrees (as illustrated in FIG. 11). By testing prototypes, applicants have observed that improved spray velocity and cold performance is obtained with this interaction region configuration.

Returning to FIGS. 11 and 12A, the jet outlet of power nozzle 1250 is the inlet for a vortex generating interaction region 1260 which terminates distally in outlet or throat 1280. Throat orifice 1280 is configured to emit the oscillating spray of fluid droplets 1300J into the ambient environment. The spray is preferably a substantially planar oscillating fan aimed in the direction of the fluid flow central axis 1202 having a selected fan angle width, preferably in the range of 50-65 degrees.

As with the embodiments described above, fluidic circuit 1200 is best described in terms of certain features and structural elements configured with specifically selected dimensions, namely, PW=Width of Power Nozzle 1250,
PD=Depth of Power Nozzle 1250,
Tw=Width of Throat 1280,
Td=Depth of Throat 1280,
IW=Width of Interaction Region 1260,
IL=Axial Length of Interaction Region 1260,
Ew=InterEar Gap Width between Ears 1262, 1264,
EL=Axial Location of inwardly projecting tips of Ears 1262, 1264,
Sw=Channel Width at Setback Slot upstream end 1261,
SL=Axial Length of Setback Slot upstream end 1261 and
$F_L$=Setback or concavity (e.g., slot end) Feature Length, or axial length of Interaction region's diverging sidewall setback or concavity feature from the interaction chamber inlet to the widest portion of laterally opposing first and second setback features 1242B, 1244B (as illustrated in FIG. 11).
$SA_L$=Sidewall Angle Segment Length, or axial length of Interaction region's diverging sidewall segments from the interaction chamber inlet to the ears 1262, 1264.

In operation, pressurized fluid flows into or enters through inlet 1210 or feed hole into the power nozzle 1230 which terminates distally in a rectangular opening with a width dimension ("PW") and a depth dimension ("PD"). Bell-shaped feed 1230 provides fluid to power nozzle 1250 which produces an accelerating fluid jet 1300 with a turbulent boundary layer that is desirable to form vortices inside interaction region 1260 (as illustrated in FIGS. 12A-12I). In this embodiment, the fluidic circuit power nozzle 1250 provides fluid to jet-steering cavity section 1240 which includes concave symmetrical slot-end shaped segments which define laterally opposing first and second setback features 1242B, 1244B thus providing a pair of opposing, symmetrical fluid jet-steering concave features in opposing diverging sidewalls 1242, 1244. The size and shape of the laterally opposing first and second slot end setback or concave features 1242B, 1244B are identical, but mirror imaged and can be configured for varying fluid jet steering performance properties. In FIGS. 11-12I, each slot end setback or concave feature (e.g., 1242B, 1244B) is configured as a substantially semi-cylindrical wall segment or concavity which, in plan view, resembles a partial ovoid or semicircle.

Seen in the plan view of FIGS. 11 and 12A-12I, laterally opposing first and second slot end concave features 1242B, 1244B will generate opposing circulating flows proximate each semi-cylindrical concavity. The resultant time-varying, colliding flows caused within fluid jet-steering cavity section 1240 help steer the resultant fluid jet forced into Interaction Region 1260 by inducing an oscillating instability to the fluid which generates first and second vortices within Interaction Region 1260 (e.g., like vortices 1310, 1320, as seen in FIGS. 12A-12I). The slot end concave features 1242B, 1244B diverge from the linear wall segments to create fluid dynamic enhancement for detaching attached fluid flow and enhance the initial generation and maintenance of fluid flow oscillation illustrated in FIGS. 12A through 12I, which illustrate a sequence of views into interaction chamber 1260 (described in greater detail below).

Figure 12A:
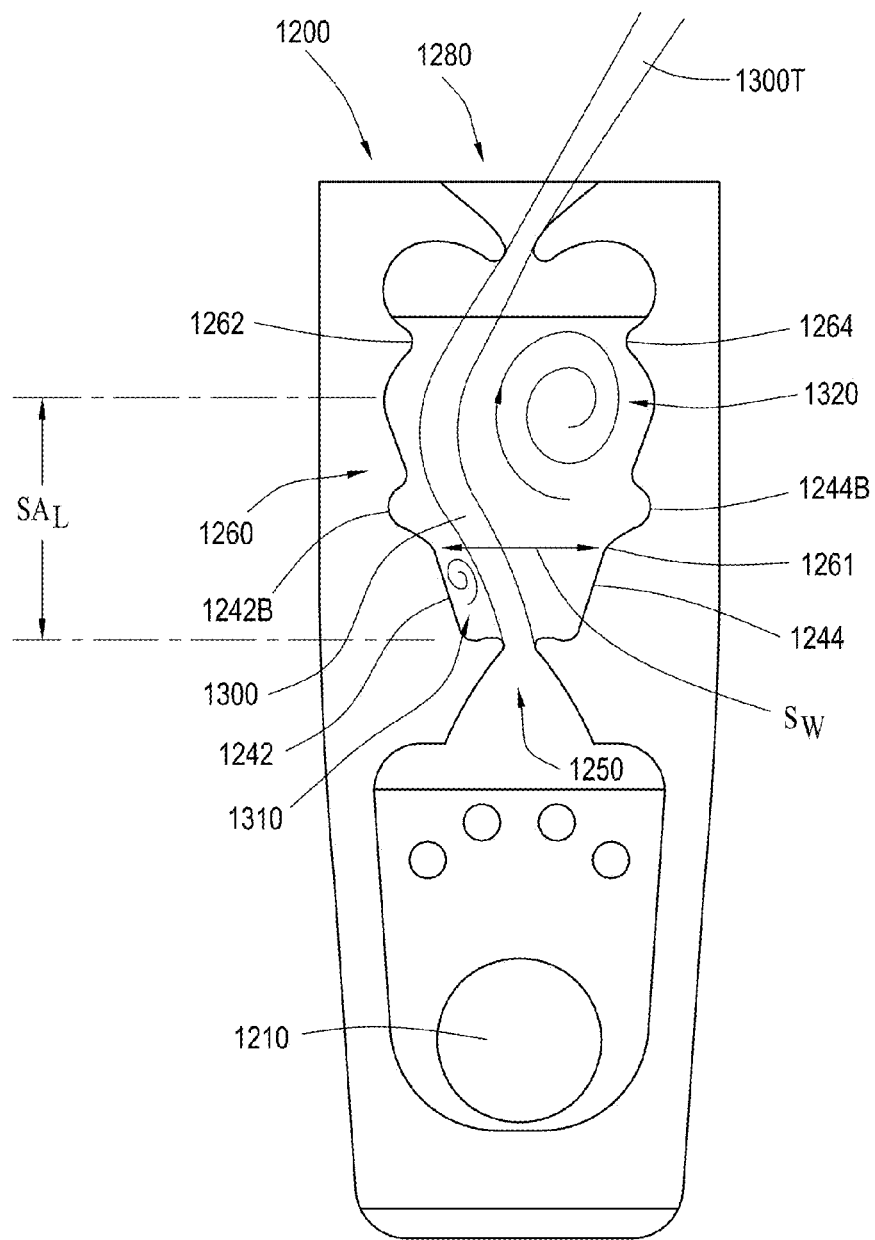

The interaction region 1260 receives the oscillating jet and the interaction region's interior geometry begins with an expanding channel segment between diverging walls 1242, 1244 terminating in a setback 1261 (see FIG. 12A) defined by slot end concave features 1242B, 1244B which are laterally separated by a selected setback width ("SW" as best seen in FIG. 12A). The flowpath or axial location of setback 1261 downstream from the power nozzle 1250 is called the setback location ("SL") and the setback angle length ("SA") may be characterized as the flowpath length (or the axial length along axis 1202) for the Interaction region's diverging sidewall segments from power nozzle 1250 to beginning with Setback 1261. The setback width ("SW") or lateral width of the region at Setback 1261 (as shown in FIG. 12A) can be used to optimize the performance of fluidic 1200 with a variety of fluids.

For the interaction region 1260, interaction region width ("Iw") and interaction region length ("IL") dimensions are configured and sized in relation to the width of power nozzle 1250, where Iw is preferably 9.6 times PW and IL is preferably 12.2 times PW. These values may be adjusted for packaging constraints. However, dynamic & cold performance are reduced as the size of interaction region 1260 is reduced below this nominal set of proportions. Preferably, Setback Feature Length $F_L$ is configured to be less than or equal to 4*Pw, to maintain the fluidic's bistable oscillating performance. As best seen in FIG. 11, the interaction region 1260 also includes a symmetrical pair of opposing inwardly projecting substantially triangular sectioned ears 1262, 1264, which each project from a wider proximal base and terminate distally in a radiussed tip. Ears 1262, 1264 are preferably equal in size and are aligned along a transverse axis at a position which is downstream from the laterally opposing first and second setback features 1242B, 1244B. Absence of ears 1262, 1264 makes the circuit 1200 more likely to generate monostable, non-oscillating sprays. The sidewalls of interaction region 1260 terminate distally with symmetrical opposing semi-cylindrical sidewall sections 1272, 1274 which are configured to receive each side's vortices, once they have traveled distally past the ears 1262, 1264 (see FIG. 12C).

Critical dimensions for the opening between the tips of ears 1262, 1264 ("EW") are: (a) the lateral width of the inter-ear gap between the inwardly projecting distal ends of the opposing ears, and (b) the axial length of the fluid's path or channel from the power nozzle 1250 to the transverse axis of the inwardly projecting ears ("EL") as best seen in FIG. 11). Applicant's experiments have led to the conclusion that optimum oscillating (i.e., bistable, rather than monostable) operation is obtained when (a) EW is greater than 6 times PW and is preferably approx. 7.2 times Pw and (b) EL is greater than 8.5 times PW) and is preferably 9.57 times PW.

One prototype fluidic oscillator configured as illustrated in FIG. 11 has the following dimensions and characteristics: The Power Nozzle width PW is 0.6 mm and the Power Nozzle height or depth PD is 1.74 mm, so the lumen area for power nozzle 1250 is 1.044 mm$^2$. The Throat orifice width TW is 0.73 mm and the Throat Orifice height or depth TD is 1.92 mm so the lumen area for Throat orifice 1280 is approximately 1.4 mm$^2$. IW (the width of Interaction Region 1260) is preferably 9.6 times PW or 5.76 mm. IL (the axial length of interaction region 1260) is preferably 12.2 times PW or 7.32 mm. Ew (the interear or transverse gap width between ears 1262, 1264) is preferably 7.2 times PW or 4.42 mm, and EL (the axial distance from power nozzle 1250 to the inwardly projecting tips of ears 1262, 1264) is preferably 9.57 times PW or 5.74 mm. Setback Feature Length $F_L$ is configured to be 3.7 times PW. Fluidic oscillator 1200, when configured in this manner, has been observed to operate very effectively and provide reliable performance over a wide range of operating temperatures, generating a substantially planar fan spray with a fan angle of 52 degrees at a fluid flow rate of 820 ml per minute when fluid is provided at fluid inlet 1210 at an operating pressure 22 PSI.

Figure 12B:
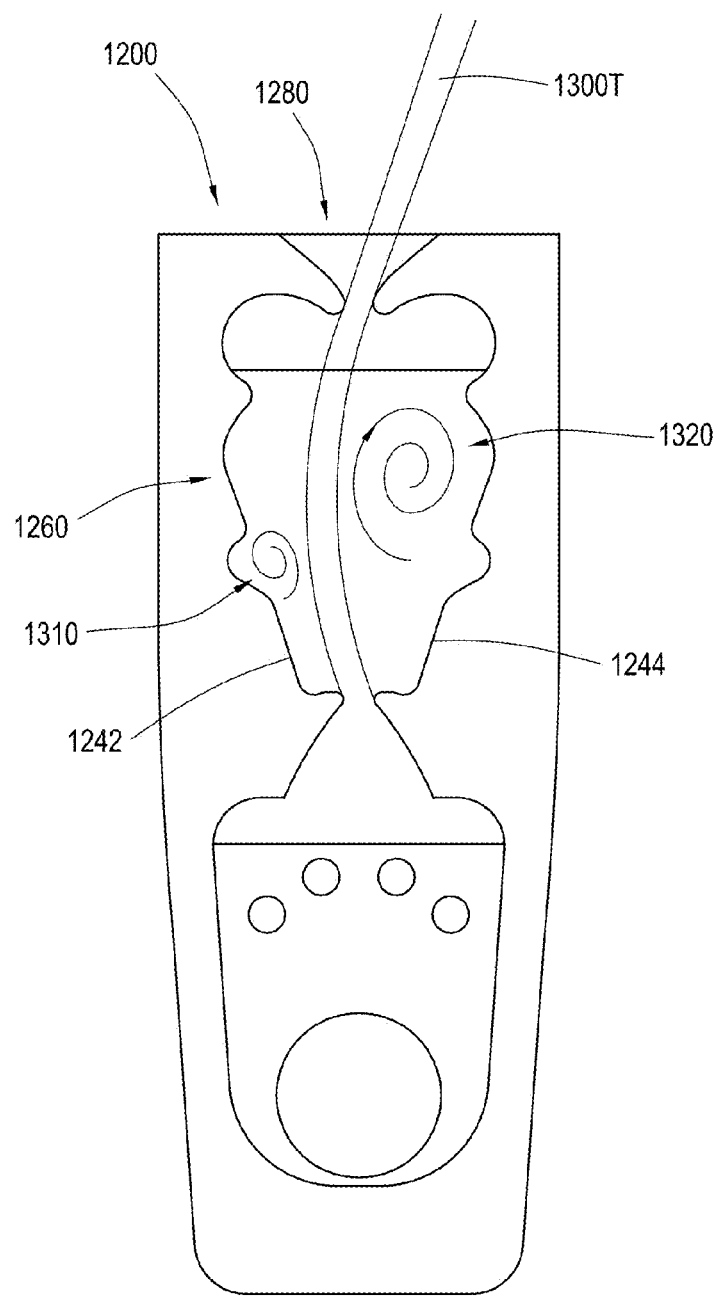

In the method of the present invention, fluid flows are steered by forming and moving circulating vortices within the interaction region of a fluidic oscillator. The formation and movement of those vortices within interaction region 1260 and the method for generating and maintaining laterally sweeping oscillating spray 1300J is best described and illustrated in the time sequential views of FIGS. 12A-12I. In FIG. 12A, (for a time "T-one") fluid jet 1300 is seen flowing close to left sidewall 1242 and a small left side vortex 1310 is seen to be forming and beginning a counter-clockwise spiral of small diameter while on the opposite side of fluid jet 1300 a right side vortex 1320 is seen to be circulating proximate right sidewall 1244B with a clockwise spiral of larger diameter, which has forced fluid jet 1300 laterally and away from the larger circulation of right side vortex 1320. A moment later in time, the operation of fluidic 1200 is illustrated in FIG. 12B (for a time "T-two"), where left side vortex 1310 is seen to be growing its counter-clockwise circulation with a larger diameter (as compared to that seen in FIG. 12A) while on the opposite side of fluid jet 1300 the right side vortex 1320 is seen to be circulating proximate right sidewall 1244B with a clockwise spiral of shrinking diameter, which allows fluid jet 1300 to move laterally and closer to right sidewall 1244. Another moment later in time, the operation of fluidic 1200 is illustrated in FIG. 12C (for a time "T-three"), where left side vortex 1310 is seen to be growing its counter-clockwise circulation with a still larger diameter (as compared to that seen in FIGS. 12A and 12B) and moving distally toward throat 1280 while on the opposite side of fluid jet 1300 the right side vortex 1320 is seen to be circulating proximate right sidewall 1244B and also moving distally to be distal from or downstream of right side ear 1264, which allows fluid jet 1300 to move laterally and even closer to right sidewall 1244, such that the distal flow path fluid jet 1300 which was concave right in FIG. 12B is seen to change inflection and is now concave left a moment later, in FIG. 12C, thereby moving the sprayed jet of fluid 1300J from a sweeping spray direction aimed to the right in FIG. 12B is seen to sweep laterally toward the left and so is aimed closer to central axis 1202 a moment later, in FIG. 12C.

Figure 12C:
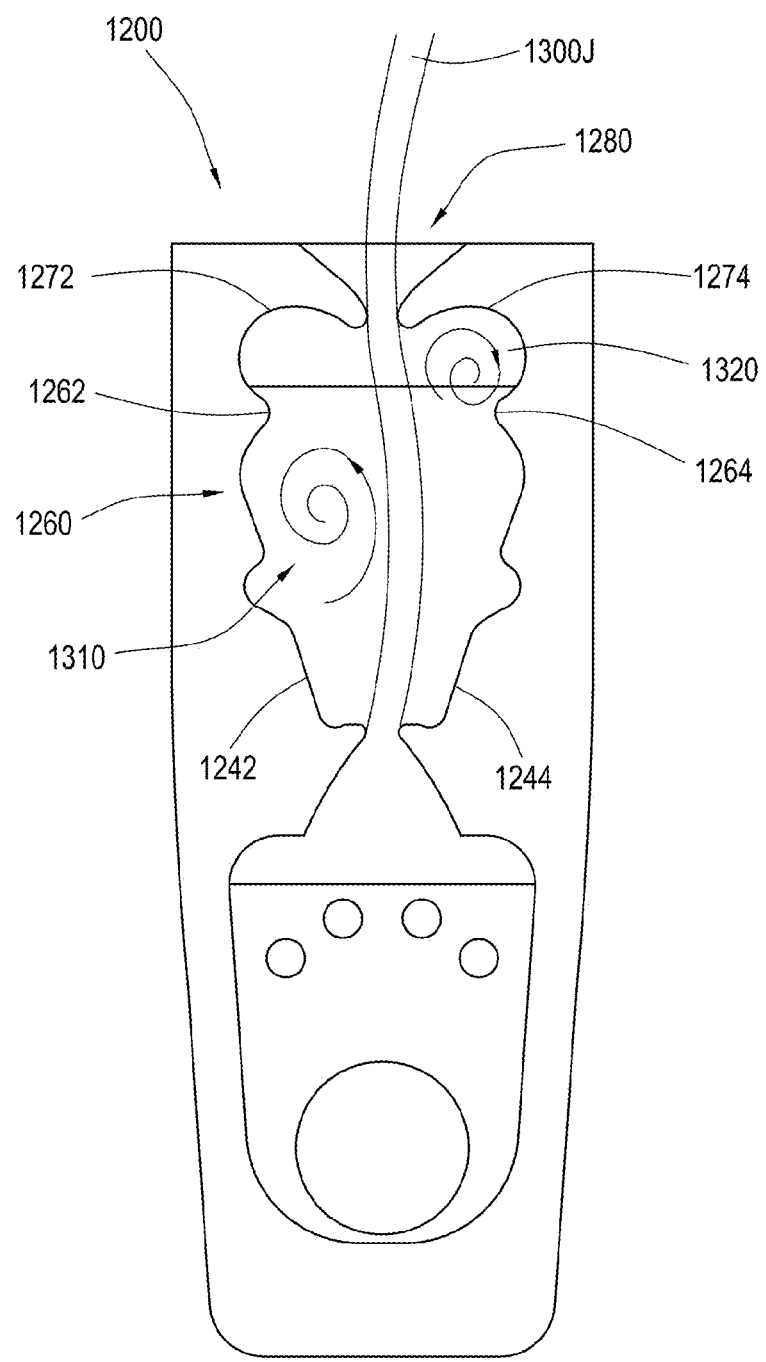
Figure 12D:
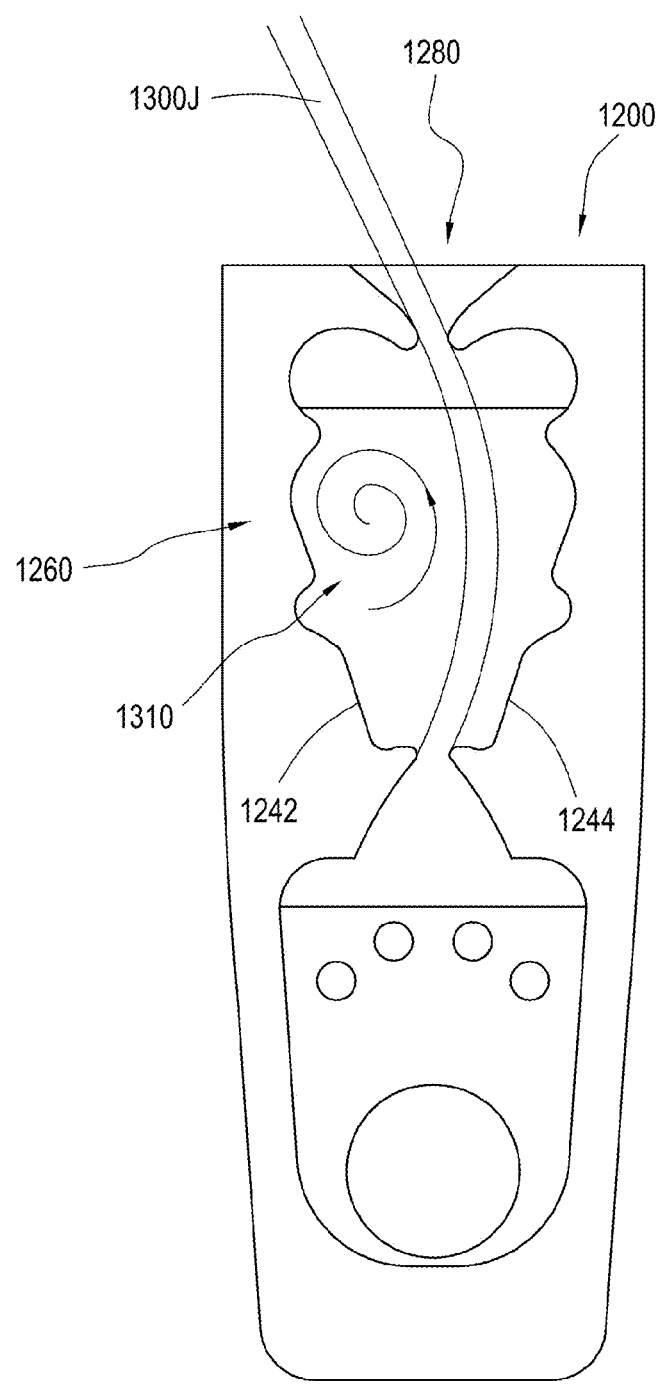
Figure 12E:
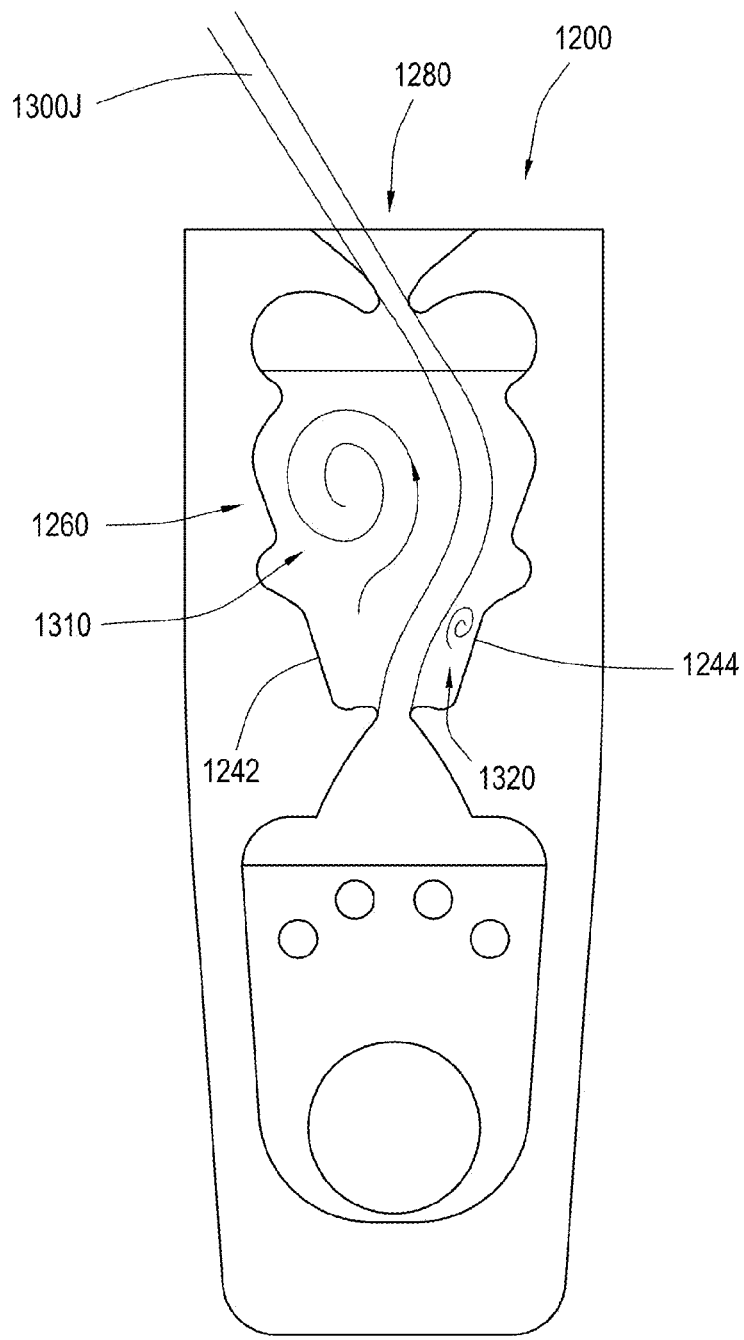
Figure 12F:
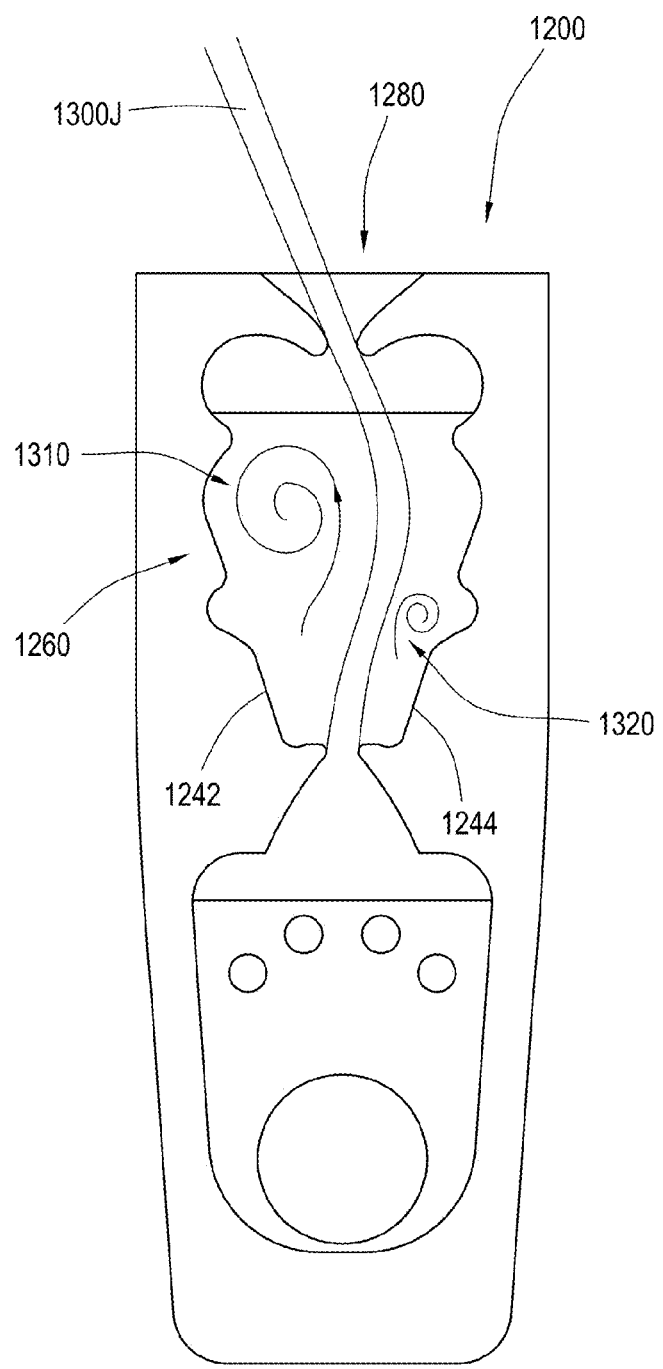
Figure 12G:
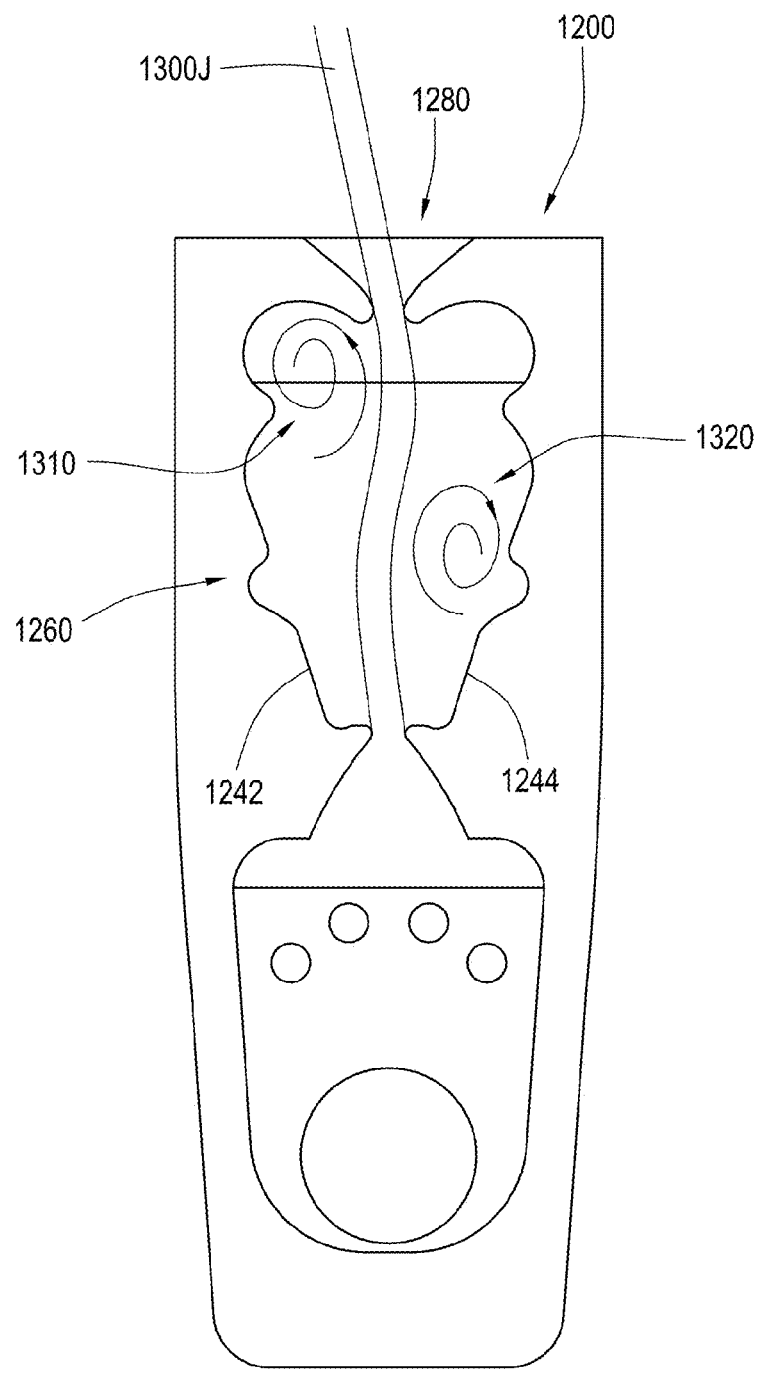

Continuing, another moment later in time, the operation of fluidic 1200 is illustrated in FIG. 12D (for a time "T-four"), where left side vortex 1310 is seen to be growing its counter-clockwise circulation with a still larger diameter (as compared to that seen in FIGS. 12A-C) and moving distally toward throat 1280 while on the opposite side of fluid jet 1300 the right side vortex 1320 is unseen, which allows fluid jet 1300 to move laterally even closer to right sidewall 1244, such that the distal flow path fluid jet 1300 is concave left, thereby moving the sprayed jet of fluid 1300J to sweep laterally away from central axis 1202 and to the left edge of the oscillating spray pattern. In the next moment, as illustrated in FIG. 12E (for a time "T-five"), left side vortex 1310 is seen to have grown its counter-clockwise circulation with a still larger diameter (as compared to that seen in FIGS. 12A-12D) while on the opposite side of fluid jet 1300 the right side vortex 1320 is seen to be re-starting a circulation proximate right sidewall 1244B with a clockwise spiral of a smaller (but growing) diameter, which will begins to force fluid jet 1300 to detach and eventually move laterally away from right sidewall 1244.

Figure 12H:
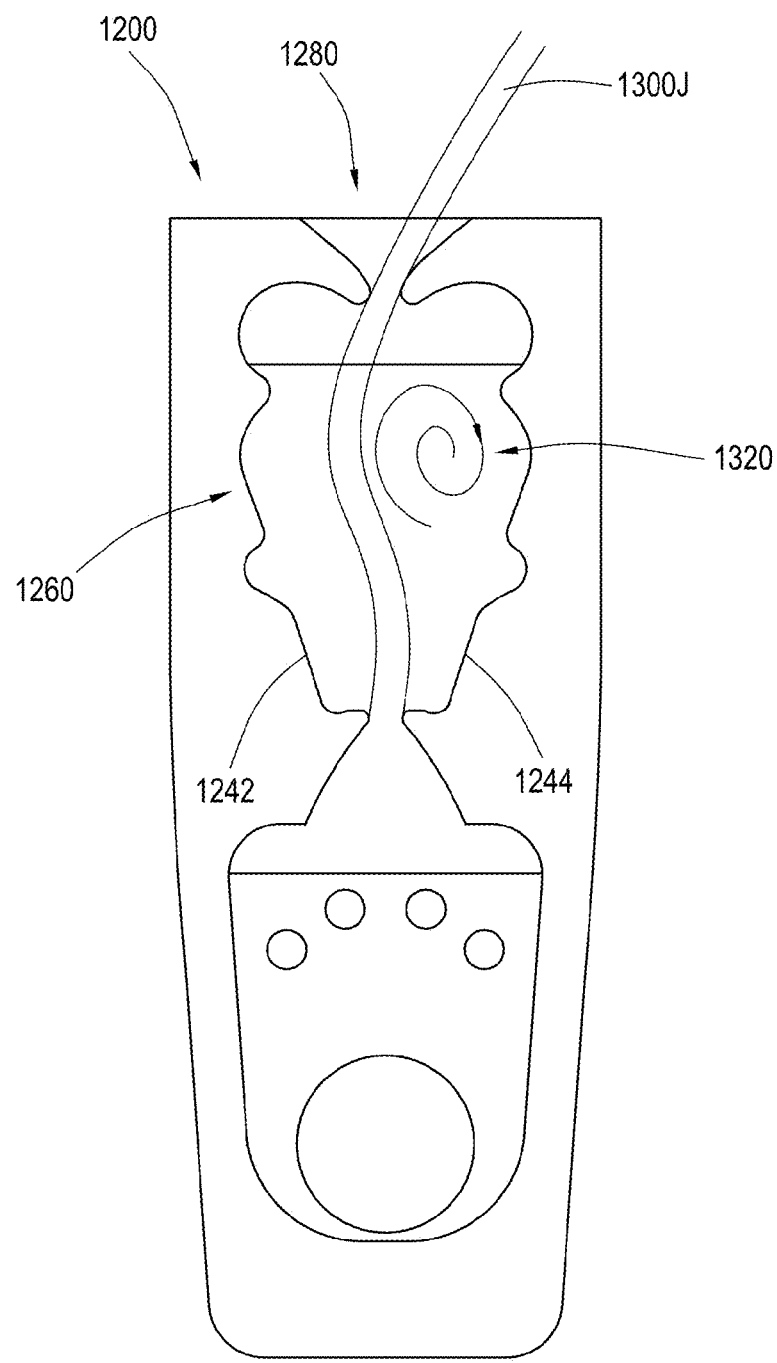
Figure 12I:
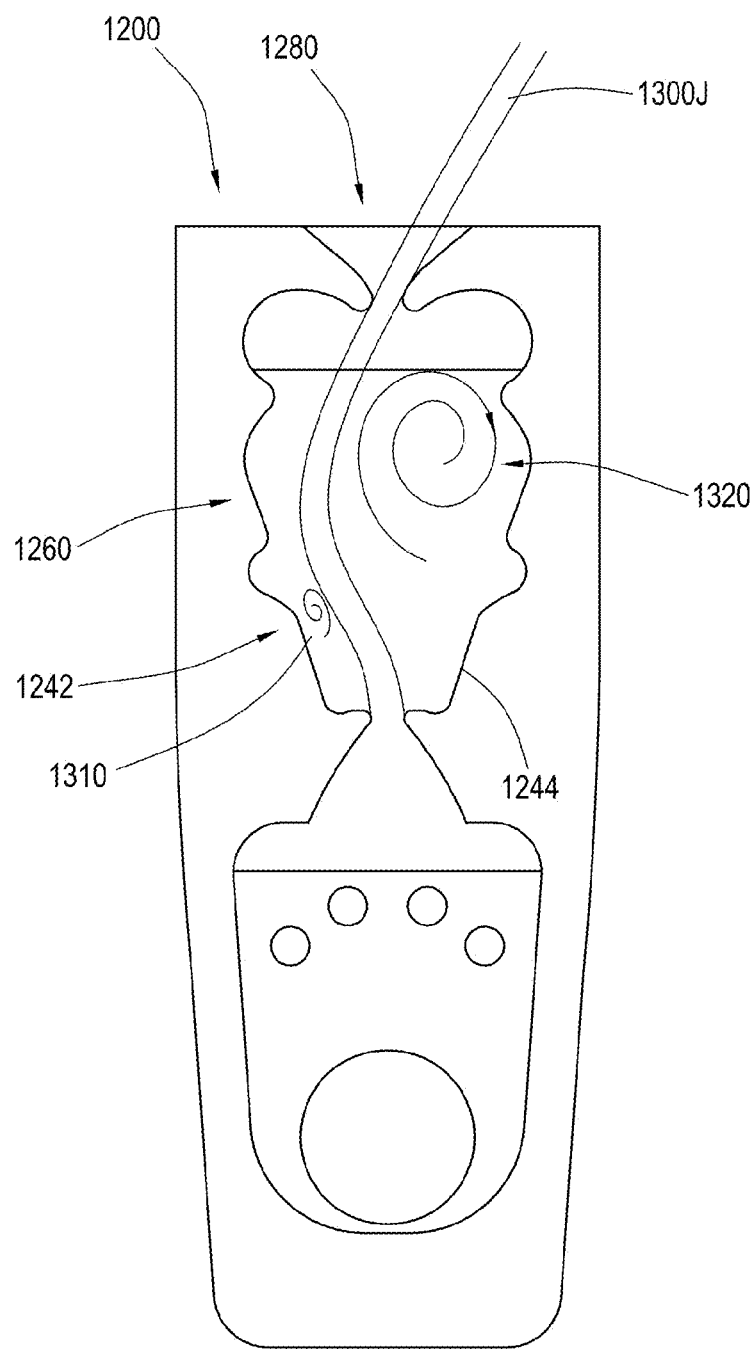

Another moment later in time, the operation of fluidic 1200 is illustrated in FIG. 12C (for a time "T-six"), the left side vortex 1310 is seen to be shrinking its counter-clockwise circulation with a smaller diameter (as compared to that seen in FIG. 12E) and moving distally toward left side ear 1262 and throat 1280 while on the opposite side of fluid jet 1300 the right side vortex 1320 is seen to be circulating in a growing diameter proximate right sidewall 1244B and also moving distally toward right side ear 1264, which allows fluid jet 1300 to move laterally away from right sidewall 1244, such that the distal flow path fluid jet 1300 is seen to change, thereby moving the sprayed jet of fluid 1300J laterally toward the right and closer to central axis 1202. Then, another moment later in time (for a time "T-seven"), where left side vortex 1310 is seen to be shrinking its counter-clockwise circulation which has now moved distally into a position downstream of left ear 1262 while on the opposite side of fluid jet 1300 the right side vortex 1320 is seen to be circulating and growing proximate right sidewall 1244B with a clockwise spiral of larger diameter, which forces fluid jet 1300 to move laterally develop an "S shaped flow with a left inflection upstream of a left inflection, where each inflection shows the flow being forced around the circulations of the vortices 1310, 1320, thereby moving the sprayed jet of fluid 1300J laterally to the right and closer to central axis 1202. FIGS. 12H and 12I (for sequential times "T-eight" and "T-nine") illustrate that as the vortices 1310, 1320 form circulations, grow, move distally and then shrink and stop, they force the fluid jet 1300 to flow distally in a path which is laterally deflected thus laterally force fluid jet 1300 to generate the desired sweeping distally projecting spray 1300J.

FIGS. 12A-12I illustrate that improved fluidic oscillator 1200 provides a novel way of generating an oscillating spray by providing a moving vortex-generating fluidic oscillator circuit including, within oscillation chamber 1260 a vortex generating fluid jet steering section 1240 having first and second symmetrically diverging sidewalls defining first and second vortex circulation generating set back features or slot end concavities 1242B, 1244B. First vortex circulation generating set back feature 1242B and the remaining portions of the oscillation chamber's internal geometry periodically generate a first vortex 1310 having a first (CCW) circulation orientation, and second vortex circulation generating set back feature 1244B contributes to generation of second vortex 1320 having a second (CW) circulation orientation alternately with first vortex 1310, where the second vortex's circulation orientation opposes the first vortex's circulation orientation. Fluid jet steering section 1240 is in fluid communication with and emits laterally oscillating fluid jet 1300 into the oscillation inducing interaction region.

Improved fluidic oscillator 1200 may also be readily configured for insertion into a nozzle housing (e.g., 10) to provide an improved nozzle configured to spray an oscillating pattern of fluid droplets once connected to and supplied by a source of fluid under pressure. Fluidic oscillator 1200 is preferably defined in a fluid impermeable substrate and having an inlet 1210 in fluid communication with the source and including a power nozzle 1250 in fluid communication with oscillation chamber 1260 having an upstream end with an inlet coupled to power nozzle 1250 for issuing a jet of fluid into oscillation chamber 1260 and a downstream end having an outlet aperture 1280 for issuing the jet of fluid 1300J into ambient space. Oscillation chamber 1260 defines a fluid jet steering section 1240 in fluid communication with power nozzle 1250 and having a first fluid jet steering sidewall feature 1242 opposite a second fluid jet steering sidewall feature 1244, each in fluid communication with one another and with power nozzle 1250, so the fluid jet steering section is in fluid communication with and emits a fluid jet 1300 into the oscillation inducing interaction region 1260.

As with the fluidic geometries described above, oscillator 1200 further includes and opposing first and second side walls which intersect opposing top and bottom walls to define the oscillation inducing interaction region in the oscillation chamber, and the opposing first and second sidewalls 1242, 1244 diverge in linear wall segments which then diverge further in concave symmetrical slot-end shaped segments which define laterally opposing first and second setback features 1242B, 1244B for causing a jet attached to the wall to detach and thereby cause the jet of fluid to develop vortices which grow and force the jet to rhythmically sweep back and forth between those sidewalls in the oscillation chamber. Oscillation inducing interaction region 1260 defines a throat width $T_W$ and a power nozzle width $P_W$ and the oscillation chamber's upstream end comprises a bell-shaped feed 1230 that promotes the spreading of the jet as it leaves the power nozzle 1250.

In use, interaction region 1260 and particularly fluid jet steering section 1240 are quickly filled with fluid from the inlet 1210 and fluidic oscillator 1200 is activated to generate a bistable oscillating spray. Fluid jet vortex creation and movement are illustrated in FIGS. 12A-12I which provide a sequential set of views for movement of fluid jet 1300. Symmetrically opposing ear-shaped protuberances 1262 and 1264 project inwardly from the opposing first and second side walls to create the jet steering vortices.

For purposes of providing a definite nomenclature, it is noted that FIG. 11 illustrates the oscillation chamber's fluid jet steering section 1240 with a first lateral slot end 1242B defining a jet detachment feature with a first fluid pressure accumulating volume opposite a second lateral slot end 1244B defining a second fluid pressure accumulating volume, where the first lateral slot end 1242B and said the second lateral slot end 1244B are in fluid communication with one another and with power nozzle 1250, and where the fluid jet steering section 1240 is shown to be in fluid communication with and emit fluid jet 1300 into the oscillation inducing interaction region.

Persons of skill in the art will appreciate that the embodiments described and illustrated in FIGS. 9-12I provide a fluidic circuit (e.g., 1100 or 1200) adapted for use in a nozzle assembly and configured to spray an oscillating pattern of fluid droplets, comprising a source of fluid under pressure (not shown), a fluidic oscillator (e.g., 1100 or 1200) having an inlet in fluid communication with the source and including a power nozzle and an oscillation chamber having an upstream end with an inlet coupled to the power nozzle for issuing a jet of fluid into the oscillation chamber and a downstream end having an outlet aperture or throat orifice (e.g., 1180 or 1280) for issuing a jet of fluid (e.g., 1300J) into ambient space. The oscillation chamber has a fluid jet steering section (e.g. 1140 or 1240) in fluid communication with the power nozzle and has a first fluid jet separation feature opposite a second fluid jet separation feature, each in fluid communication with one another and with the power nozzle, where the fluid jet steering section is in fluid communication with and emits a fluid jet into an oscillation inducing interaction region. The oscillator further includes opposing first and second side walls which intersect opposing the top and bottom walls to define the oscillation inducing interaction region in the oscillation chamber for causing the jet of fluid to rhythmically sweep back and forth between the sidewalls in the oscillation chamber, and the oscillation inducing interaction region defines the throat width and the power nozzle width, while the upstream end comprises a tapering or narrowing (preferably bell-shaped) feed (e.g., 1130 or 1230) that promotes the spreading of the jet as it leaves the power nozzle; wherein the interaction region and the fluid jet steering section are quickly filled with fluid from the source and the fluidic oscillator is activated to reliably form moving circulating vortices on alternate sides wherein the vortices move distally to generate a repeatable oscillating jet stream and thus provide a bistable, oscillating spray.

Having described preferred embodiments of a new and improved structure and method, it is believed that other modifications, variations and changes will be suggested to those skilled in the art in view of the teachings set forth herein. It is therefore to be understood that all such variations, modifications and changes are believed to fall within the scope of the present invention.

We claim:

1. A fluidic nozzle in the form of a first fluidic oscillator configured to spray an oscillating pattern of fluid droplets, said oscillator comprising:
   an inlet configured to receive pressurized fluid;
   an oscillation chamber having an upstream end, a downstream end, first and second sidewalls, and an oscillator axis extending between said upstream and downstream ends;
   a power nozzle, in fluid communication via a downstream-tapered feed for issuing a jet of said pressurized fluid into said oscillation chamber;
   an outlet aperture at said downstream end for issuing said jet of fluid into ambient space, wherein said outlet aperture is positioned in alignment with said power nozzle along said oscillator axis;
   a fluid jet steering section in said oscillation chamber in fluid communication with said power nozzle and defined between opposed first and second steering sections of said first and second sidewalls, respectively, that diverge in a downstream direction from one another and from said oscillator axis;
   an oscillation inducing interaction region in downstream fluid communication with said fluid jet steering section and configured to receive said fluid jet therefrom, wherein said oscillation inducing interaction region is defined between opposing first and second interaction region sections of said first and second sidewalls, said interaction region sidewall sections being disposed symmetrically relative to said oscillator axis and substantially diverging from one another and said oscillator axis;
   wherein said first and second interaction region sidewall sections have opposed respective first and second setback sections configured to cause said fluid jet to alternately attach and detach from its respective interaction region sidewall and thereby cyclically sweep back and forth between said sidewalls in said oscillation chamber; and
   wherein said first and second setback sections further comprising first and second lateral slot ends configured as concave regions defined in said first and second steering sections of said first and second sidewalls.

2. The fluidic nozzle of claim 1, wherein said interaction region includes opposing generally ear-shaped protuberances projecting inwardly from said respective opposing interaction region sidewall sections at locations downstream of said setback sections and configured to create respective alternating jet steering vortices on respective sides of the fluid jet from fluid in the fluid jet.

3. The fluidic nozzle of claim 2, wherein said protuberances are configured and positioned to create said vortices as moving circulating vortices alternating on opposite sides of said fluid jet in said interaction chamber, the circulating vortices moving distally and proximally in a cyclical manner.

4. The fluidic nozzle of claim 1, wherein said first and second steering sections each diverge at a first selected sidewall divergence angle from the oscillator axis to provide an acute divergence angle between said sidewalls to promote spreading of the fluid jet as its fluid leaves the power nozzle.

5. The fluidic nozzle of claim 4, wherein said acute divergence angle between said sidewalls is less than 60 degrees.

6. The fluidic nozzle of claim 5, wherein said acute divergence angle between said sidewalls is in the range of 30 to 40 degrees.

7. The fluidic nozzle of claim 5, wherein said first selected sidewall divergence angle is 20 degrees from said oscillator axis.

8. The fluidic nozzle of claim 1, wherein the downstream axial distance FL between the upstream end of the interaction region and a point of maximum concavity in each of said first and second setback sections is less than or equal to four times the width Pw of the power nozzle at the upstream end of the interaction chamber.

9. The fluidic nozzle of claim 8, wherein FL is configured to be 3.7 times Pw.

10. The fluidic nozzle of claim 8, wherein the minimum transverse distance Ew between said ear-shaped protuberances is greater than six times Pw, and wherein the downstream axial distance EL between the upstream end of the interaction region and the point of minimum transverse distance between said ear-shaped protuberances is greater than 8.5 times Pw.

11. The fluidic nozzle of claim 8, wherein Ew is approximately 7.2 times Pw, and wherein EL is approximately 9.57 times Pw.

12. The fluidic nozzle of claim 8, wherein the maximum width Iw of said interaction region at an axial location between said setback sections and said ear-shaped protuberances is approximately 9.6 times Pw, and the length IL of said interaction region between said power nozzle and said outlet aperture is approximately 12.2 times Pw.

13. The fluidic nozzle of claim 1, wherein said first fluidic oscillator is defined in a fluid-impermeable substrate, and further comprising a second fluidic oscillator defined in said substrate, wherein said substrate is substantially planar and has first and second opposite sides, wherein said second fluidic oscillator is defined in said second side and said first fluidic oscillator is defined in said first side;
wherein said second fluidic oscillator includes an inlet in fluid communication with said inlet of said first fluidic oscillator; and
wherein said second fluidic oscillator includes an outlet aperture for issuing a second oscillating jet of fluid into ambient space.

14. The moving vortex-generating fluidic oscillator circuit of claim 1, wherein said fluidic oscillator is a first fluidic oscillator defined in a fluid-impermeable substrate, and further comprising a second fluidic oscillator defined in said substrate, wherein said substrate is substantially planar and has first and second opposite sides, wherein said second fluidic oscillator is defined in said second side and said first fluidic oscillator is defined in said first side;
wherein said second fluidic oscillator comprises an inlet in fluid communication with said first oscillator's inlet; and
wherein said second fluidic oscillator comprises an outlet aperture for issuing a second oscillating jet of fluid into ambient space.

15. The fluidic nozzle of claim 1 wherein said downstream-tapered feed has an arcuate bell-shape configured to cause spreading of the fluid jet as it leaves the power nozzle.

16. A moving vortex-generating fluidic oscillator circuit configured to generate an oscillating pattern of fluid droplets, comprising:
a fluidic oscillator inlet adapted for fluid communication with a source of pressurized fluid, and a power nozzle where said inlet and said power nozzle are aligned along a central fluid flow path axis;
said oscillator further including an oscillation chamber having an upstream end with an inlet coupled to said power nozzle for issuing a jet of fluid into said oscillation chamber, and a downstream end having an outlet aperture for issuing a jet of fluid into ambient space;
wherein said oscillation chamber has a vortex generating fluid jet steering section in fluid communication with said power nozzle and having first and second symmetrically diverging sidewalls defining first and second vortex circulation generating set back features;
said first vortex circulation generating set back feature diverging and then converging relative to said flow path axis in a downstream direction and configured to generate a first periodically varying vortex having a first circulation orientation, and said second vortex circulation generating set back feature diverging and then converging relative to said flow path axis and configured to generate a second periodically varying vortex having a second circulation orientation alternately with said first vortex, wherein said second vortex circulation orientation opposes the first vortex circulation orientation;
wherein said fluid jet steering section is in fluid communication with and is configured to emit said jet of fluid as a laterally oscillating fluid jet into an oscillation inducing interaction region with downstream diverging sidewalls; and
wherein said opposing first and second sidewalls are configured to intersect opposing top and bottom walls to define said oscillation inducing interaction region in said oscillation chamber to cause said first and second vortices to alternately move distally and proximally in phase opposition to cause said jet of fluid to rhythmically sweep back and forth between said sidewalls in said oscillation chamber.

17. The moving vortex-generating fluidic oscillator circuit of claim 16, further comprising:
a downstream-tapered feed disposed to deliver said pressurized fluid from said source to said power nozzle;
wherein said downstream-tapered feed has a bell-shape configured to cause spreading of the fluid jet as it leaves the power nozzle
wherein the interaction region and said fluid jet steering section are quickly filled with fluid from said source, and the fluidic oscillator is activated to generate said oscillating spray pattern.

18. The moving vortex-generating fluidic oscillator circuit of claim 16, wherein said interaction region includes opposing smoothly contoured generally ear-shaped protuberances projecting inwardly from said opposing first and second side walls.

19. The moving vortex-generating fluidic oscillator circuit of claim 18, wherein said fluidic oscillator is formed in a fluid-impermeable substrate, said oscillator further comprising first and second lateral slot ends configured as concave regions defined in said first and second steering sections of said first and second sidewalls, respectively, such that said first lateral slot end and said second lateral slot end are in fluid communication with one another and with said power nozzle, and wherein said fluid jet steering section is in fluid communication with and emits said fluid jet into the oscillation inducing interaction region.

20. The moving vortex-generating fluidic oscillator circuit of claim 19, wherein said first sidewall and second sidewalls have respective first and second diverging sidewall segments, said first diverging sidewall segment diverging at a first selected sidewall divergence angle from the central fluid flow path axis, said second diverging sidewall segment diverging away from said central fluid flow path axis and said first sidewall to provide an acute sidewall to sidewall divergence angle and promoting the spreading of the jet as it leaves the power nozzle.

21. The moving vortex-generating fluidic oscillator circuit of claim 20, wherein said acute sidewall to sidewall divergence angle is less than 60 degrees.

22. The moving vortex-generating fluidic oscillator circuit of claim 21, wherein said acute sidewall to sidewall divergence angle is in the range of 30 to 40 degrees.

23. The moving vortex-generating fluidic oscillator circuit of claim 22, wherein said oscillation chamber's first selected sidewall divergence angle is 20 degrees from said central fluid flow path axis.

24. The moving vortex-generating fluidic oscillator circuit of claim 19, wherein the downstream axial distance FL between the upstream end of the interaction region and a point of maximum concavity in each of said first and second setback sections is less than or equal to four times the width Pw of the power nozzle at the upstream end of the interaction chamber.

25. The moving vortex-generating fluidic oscillator circuit of claim 24, wherein said FL is approximately 3.7 times Pw.

26. The moving vortex-generating fluidic oscillator circuit of claim 24, wherein the minimum transverse distance Ew between said ear-shaped protuberances is greater than six times Pw, and wherein the downstream axial distance EL between the upstream end of the interaction region and the point of minimum transverse distance between said ear-shaped protuberances is greater than 8.5 times Pw.

27. The moving vortex-generating fluidic oscillator circuit of claim 26, wherein Ew is approximately 7.2 times Pw, and wherein EL is approximately 9.57 times Pw.

28. The moving vortex-generating fluidic oscillator circuit of claim 26, wherein the maximum width lw of said interaction region at an axial location between said setback sections and said ear-shaped protuberances is approximately 9.6 times Pw, and the length IL of said interaction region between said power nozzle and said outlet aperture is approximately 12.2 times Pw.

29. The moving vortex-generating fluidic oscillator circuit of claim 16, wherein said steering section comprises a first cavity in said first sidewall defining a first fluid pressure accumulating volume opposite a second cavity in said second sidewall defining a second fluid pressure accumulating volume;

wherein said first cavity and said second cavity are in fluid communication with one another and with said power nozzle; and further comprising an oscillation inducing interaction region in downstream fluid communication with said fluid jet steering section and configured to receive said fluid jet therefrom.

\* \* \* \* \*